US012775607B2

(12) United States Patent
Sukur et al.

(10) Patent No.: US 12,775,607 B2
(45) Date of Patent: Oct. 27, 2026

(54) SYSTEMS AND METHODS FOR MANAGING DIGITAL ASSETS AND DIGITAL ASSET TRANSACTIONS

(71) Applicant: Wells Fargo Bank, N.A., San Francisco, CA (US)

(72) Inventors: Anita Sukur, Minneapolis, MN (US); Ian T. Staley, San Francisco, CA (US); Ashmita Regmi, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/905,821

(22) Filed: Oct. 3, 2024

(65) Prior Publication Data

US 2026/0099480 A1 Apr. 9, 2026

(51) Int. Cl.

| | |
|---|---|
| ***G06F 7/04*** | (2006.01) |
| ***G06F 16/22*** | (2019.01) |
| ***G06F 21/60*** | (2013.01) |
| ***G06F 40/284*** | (2020.01) |

(52) U.S. Cl.

CPC ........ *G06F 16/2255* (2019.01); *G06F 21/602* (2013.01); *G06F 40/284* (2020.01)

(58) Field of Classification Search

CPC ....... H04L 9/0866; H04L 9/3213; H04L 9/50; H04L 63/0876

See application file for complete search history.

(56) References Cited

U.S. PATENT DOCUMENTS

| | | | |
|---|---|---|---|
| 12,124,552 B2 | 10/2024 | Shannon et al. | |
| 12,164,968 B1 | 12/2024 | Budnahatti Veerabhadrappa et al. | |
| 2009/0106178 A1 | 4/2009 | Chu | |
| 2013/0254555 A1 | 9/2013 | Greene et al. | |
| 2014/0150108 A1* | 5/2014 | Low ........................ | G06F 21/60 726/26 |
| 2018/0005186 A1 | 1/2018 | Hunn | |
| 2019/0012595 A1 | 1/2019 | Beser et al. | |

(Continued)

FOREIGN PATENT DOCUMENTS

| | | |
|---|---|---|
| JP | 2026-026910 A | 2/2026 |
| KR | 20230115824 A | 8/2023 |

(Continued)

OTHER PUBLICATIONS

Lee et al., SPChain: A Smart and Private Blockchain-Enabled Framework for Combining GDPR-Compliant Digital Assets Management with AI Models, Dec. 9, 2022, IEEE, pp. 130424-130443. (Year: 2022).*

(Continued)

*Primary Examiner* — Philip J Chea
*Assistant Examiner* — Jenise E Jackson
(74) *Attorney, Agent, or Firm* — Foley & Lardner LLP

(57) ABSTRACT

The arrangements described herein relate to a computing system configured to receive a file comprising text strings, determine a validity of information in the text strings using at least one ML model, in response to determining the validity of the information in the text strings, tokenize the file by generating a digital asset corresponding to the file, the token includes a pointer to the file, and record the digital asset on a distributed ledger database/blockchain.

20 Claims, 10 Drawing Sheets

(56) References Cited

U.S. PATENT DOCUMENTS

| | | | | |
|---|---|---|---|---|
| 2019/0058697 | A1 | 2/2019 | Chang et al. | |
| 2020/0014527 | A1 | 1/2020 | Subramaniam | |
| 2020/0127828 | A1 | 4/2020 | Liu et al. | |
| 2020/0242221 | A1 | 7/2020 | Chen et al. | |
| 2021/0344507 | A1 | 11/2021 | Peng | |
| 2022/0198563 | A1 | 6/2022 | Kaplan et al. | |
| 2022/0366152 | A1 | 11/2022 | Zenkel et al. | |
| 2022/0398538 | A1 | 12/2022 | Jakobsson et al. | |
| 2023/0206338 | A1 | 6/2023 | Davis | |
| 2023/0214502 | A1* | 7/2023 | Hadi | G06F 40/253 726/30 |
| 2023/0351051 | A1 | 11/2023 | Woo et al. | |
| 2023/0359709 | A1 | 11/2023 | Nickerson et al. | |
| 2024/0069752 | A1 | 2/2024 | Erb et al. | |
| 2024/0070306 | A1 | 2/2024 | Jurat et al. | |
| 2024/0153022 | A1 | 5/2024 | Fields et al. | |
| 2024/0171396 | A1 | 5/2024 | Ferenczi | |
| 2024/0267412 | A1 | 8/2024 | Banerjee et al. | |
| 2024/0311910 | A1 | 9/2024 | Van Schouwen et al. | |
| 2024/0346336 | A1 | 10/2024 | Fanfani | |
| 2024/0412207 | A1 | 12/2024 | Williams et al. | |
| 2025/0078157 | A1* | 3/2025 | Fakieh | G06Q 20/065 |
| 2025/0078158 | A1 | 3/2025 | Fakieh et al. | |
| 2025/0078190 | A1 | 3/2025 | Fakieh et al. | |
| 2025/0284726 | A1 | 9/2025 | Moss et al. | |

FOREIGN PATENT DOCUMENTS

| | | | |
|---|---|---|---|
| WO | WO-2024/041130 | A1 | 2/2024 |
| WO | WO-2025/046283 | A1 | 3/2025 |

OTHER PUBLICATIONS

Bernabe et al., Privacy-Preserving Solutions for Blockchain: Review and Challenges, Oct. 31, 2019, IEEE, pp. 164908-164940. (Year: 2019).*

* cited by examiner

SYSTEMS AND METHODS FOR MANAGING DIGITAL ASSETS AND DIGITAL ASSET TRANSACTIONS

BACKGROUND

Provider institutions, platforms, applications, enterprises, and individuals are moving toward transacting using tokenized or digital assets. Unlike traditional transactions, digital asset transactions rely on correct and accurate identification of users for both parties (e.g., transferors and transferees) to the transactions, in order to properly authenticate, verify, process, and record the information related to the transactions. Although Distributed Ledger Technology (DLT) and blockchains can provide immutable records of digital asset transactions, incorrect or inaccurate user identification can result in transaction delays and failure and trigger record correction processes in the blockchains, thus impacting the efficiency and effectiveness of digital asset transactions. This remains a major challenge for wide adaptation of digital asset transactions.

Computing systems are becoming increasing more reliant on Artificial Intelligence (AI) models, which can be monetized as a valued commodity. Given the different versions and variations of Machine Learning (ML) models as a result of different model users training or fine-tuning a same base model using different training datasets and different training criteria, maintaining record of the different versions of the ML models and different training datasets used can be challenging. Furthermore, different licensing or use schemes of ML models can also be difficult to monitor for secondary markets for ML models.

Currently, no set infrastructure or governance model exists for enterprise-wide of versioning and sharing of AI models. Training data for AI models cannot be easily shared and distributed among different participants interested in collaborative model training and model learnings, especially among participants of different geographical locations and countries with different laws and regulations (e.g., privacy laws, intellectual property laws, etc.). Currently, trained and re-trained model versions of an AI model are not authenticated, digitally certified, or signed, thus, the model versions cannot be easily distributed to run on different locations and devices.

SUMMARY

The arrangements described herein relate to systems, methods, and non-transitory processor readable media for a universal resolver including at least one processor and at least one memory coupled to the at least one processor. The at least one processor is configured to receive, from a first blockchain registry associated with a first computing system, a first provider institution identifier of a first provider institution and a first user identifier of a user. The first provider institution identifier and the first user identifier are recorded in a first distributed ledger database/blockchain. The at least one processor is configured to receive, from a second blockchain registry associated with a second computing system, a second provider institution identifier of a second provider institution and a second user identifier of the user. The second provider institution identifier and the second user identifier are recorded in a second distributed ledger database/blockchain. The at least one processor is configured to determine a universal unique identifier for the user based at least in part on the first provider institution identifier, the first user identifier, the second provider institution identifier, and the second user identifier. The universal unique identifier is recorded on a third distributed ledger database/blockchain. The universal unique identifier is sent to the first blockchain registry and the second blockchain registry. The first blockchain registry records the universal unique identifier in the first distributed ledger database/blockchain. The second blockchain registry records the universal unique identifier in the second distributed ledger database/blockchain.

The arrangements described herein relate to systems, methods, and non-transitory processor readable media for a computing system including at least one processor and at least one memory coupled to the at least one processor, the at least one processor is configured to tokenize a Machine Learning (ML) model by determining a first token for the ML model and at least one second token for intellectual property rights of the ML model. The first token includes a link to each of the at least one second token, and each of the at least one second token includes a link to the first token. The at least one processor is configured to tokenize training dataset used to train the ML model by determining a third token for the training data and record the first token, the at least one second token, and the third token on a distributed ledger database/blockchain.

The arrangements described herein relate to systems, methods, and non-transitory processor readable media for a computing system including at least one processor and at least one memory coupled to the at least one processor, the at least one processor is configured to receive, from a first blockchain registry associated with a first computing system, a first digital asset corresponding to a first version of an ML model, the first digital asset is recorded in a first distributed ledger database/blockchain, receive, from a second blockchain registry associated with a second computing system, a second digital asset corresponding to a second version of the ML model, the second digital asset is recorded in a second distributed ledger database/blockchain, record the first version and the second version of the ML model in a third distributed ledger database/blockchain, and select from the first version and the second version of the ML model a champion model of the ML model.

The arrangements described herein relate to systems, methods, and non-transitory processor readable media for a computing system including at least one processor and at least one memory coupled to the at least one processor, the at least one processor is configured to receive a file comprising text strings, determine a validity of information in the text strings using at least one ML model, in response to determining the validity of the information in the text strings, tokenize the file by generating a digital asset corresponding to the file, the token includes a pointer to the file, and record the digital asset on a distributed ledger database/blockchain.

Figure 1:
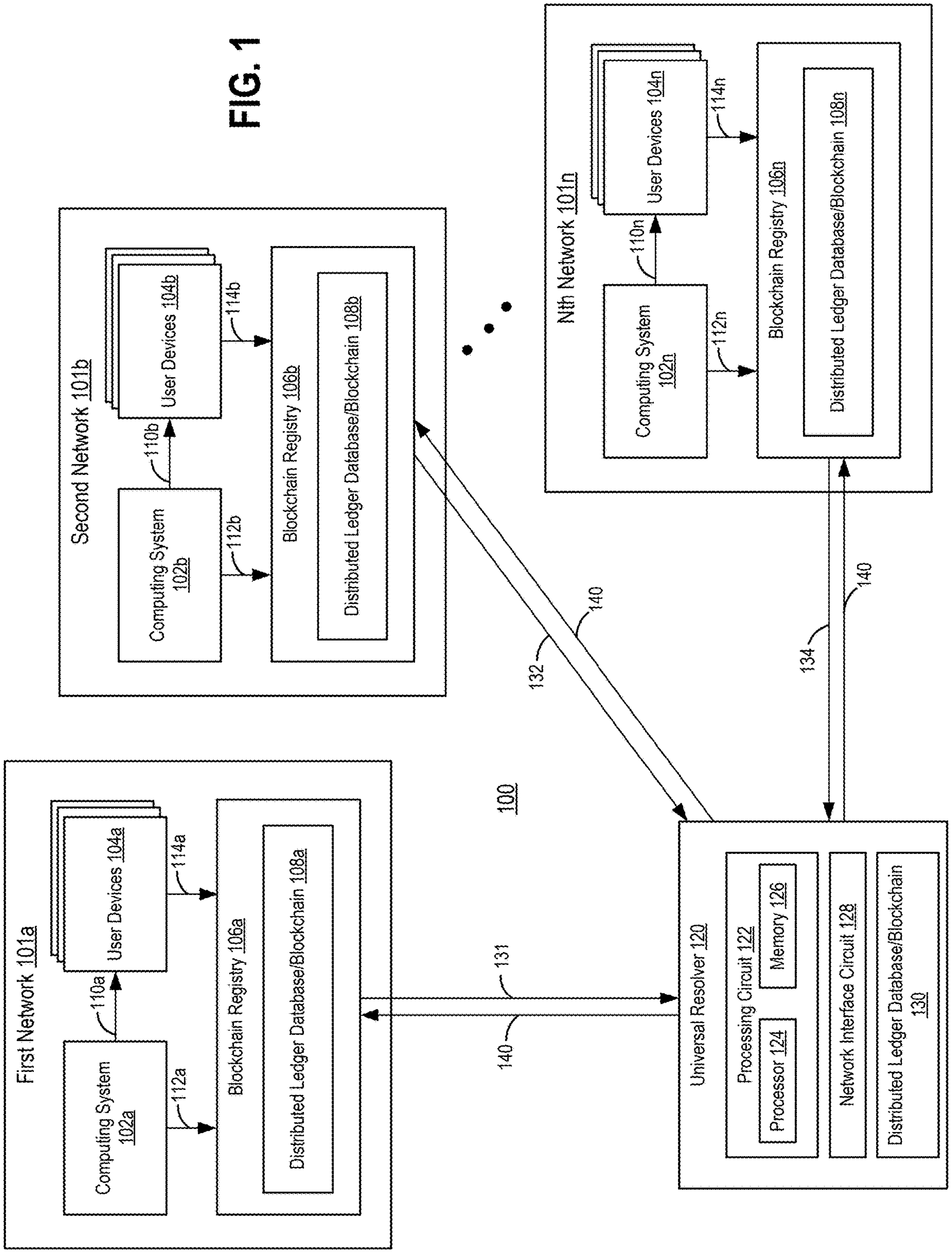
FIG. 1 is a block diagram illustrating an example system for generating and using a universal unique identifier for a user, according to various arrangements.

It will be recognized that some or all of the figures are schematic representations for purposes of illustration. The figures are provided for the purpose of illustrating one or more arrangements with the explicit understanding that they will not be used to limit the scope or the meaning of the claims.

DETAILED DESCRIPTION

Conventionally, no unique identifier of a digital asset exists across multiple provider institutions, platforms, applications, enterprises, and individual devices. For example, no unique identifier exists for secondary market transactions, trade finance, securities of mortgages, and so on across different siloed provider institution markets. This poses significant challenges for DLT-based or blockchain-based electronic transaction platforms and networks used to perform digital asset transactions, as such platforms and networks for different provider institutions require significant time and computing resources to reconcile information and metadata of users who may have accounts across the different provider institutions. Failure to reconcile the information and metadata of a user or errors/inaccuracies in the information and metadata of the user can result in transaction delays and failure, thus impacting the efficiency and effectiveness of digital asset transactions.

To promote wide adoption of digital assets and improve efficiency and effectiveness of transactions involving digital assets, the arrangements described herein relate to immutable traceability and monitoring across various networks on which the provider institutions, platforms, applications, enterprises, and individual devices are located. The framework described herein can enable different networks (each corresponding to a different provider institution, platform, application, enterprise, etc.) to establish a single verified identity for a user to be shared cross those networks. The single verified identity of a user is identified using a universal unique identifier, which can be provided to different networks to identify the user.

In some arrangements, a provider institution has a provider institution Decentralized Identifier (DID), and users (e.g., customers) of the provider institution have respective user DIDs. A blockchain registry communicates with a universal resolver to resolve shared DIDs. The universal resolver can use a secure enclave environment for identity resolution. Personal Identity Information (PII) is not the exposed to the universal resolver to ensure the highest level of trust. In some examples, the universal resolver can be provided as a service to provider institutions, platforms, applications, enterprises, and individual devices. The universal resolver can resolve all metadata to create a single record for each user. In some arrangements, various different provider institutions, platforms, applications, enterprises, and individual devices can opt in and provide metadata to the universal resolver, which can resolve all metadata from the different provider institutions, platforms, applications, enterprises, and individual devices. In some examples, an audit log can be provided for regulators.

As used herein, in some arrangements, a "digital asset" (or a "tokenized asset") may be a data package or structure including information (e.g., values in fields) and an amount of digital or virtual currency that is owned by one or more parties (e.g., user, individual, institution, company, or so on) and used to perform exchanges (e.g., for goods or services) in a computer networked environment. The digital asset may be encrypted and decrypted using one or more public and private key pairs (sometimes referred to as a "verification and signing key pair"). In some arrangements, the digital asset can be in the form of a token (e.g., a fungible token, a Non-Fungible Token (NFT), etc. In some arrangements, a digital asset may be a digital form of a fiat currency of one or more nations, one or more countries, or one or more regions. In some arrangements, the digital asset may be issued by a central provider (e.g., Federal Reserve System (FRS)), or by a specific provider (e.g., bank). The digital asset may be a Math-Based Currency (MBC) (e.g., cryptocurrency, Bitcoin, Ethereum, Stablecoin Tether (USDT), USD Coin (USDC)) or derived (for example, as a token) from cryptocurrency. The digital asset may be a central bank digital currency (CBDC) (e.g., Digital USD, Digital Euro, Digital Japanese Yen, Digital British Pound, Digital Swiss Franc) or derived (for example, as a token) from CBDC. In various arrangements, the digital asset can include information in one or more metadata fields that may be modified by the one or more parties. Furthermore, smart contracts can configured to provide one or more functionalities of the digital asset and can be wrapped into the data package or block data of the digital asset.

Additionally, in the context of the transactions exchange process involving digital assets within DLT network, public and private key pairs can be used to ensure the security and integrity of exchanges. The key pairs can be used in the encryption and decryption process that safeguards the digital assets and validates transactions. For example, when a first user (transferor or sender) initiates an exchange request on a first DLT network, the first user's private key can be used to sign the transaction. This digital signature verifies that the transaction has been initiated by the rightful owner of the digital asset. The transaction, including details like the source identifier, destination identifier, and amount of the digital asset (e.g., MBC), is then encrypted using the first user's private key. This encryption ensures that the transaction details remain secure and tamper-proof as they traverse the network. In this example, on the receiving end, the processing circuits associated with a second DLT network can use the first user's public key to decrypt and validate the exchange notification. The public key can decrypt the transaction encrypted by the corresponding private key, thus confirming the authenticity and integrity of the transaction. Moreover, the process of creating a new block on the blockchain in both DLT networks can include the use of public and private keys. When a new block is created and added to the blockchain, it can be encrypted with a private key and can be verified by anyone on the network using the corresponding public key.

As used herein, a "user" generally refers to an entity identified by the universal unique identifier and a user identifier used by each of one or more network (e.g., each provider institution, platform, application, enterprise, etc.). In some arrangements, a user includes a customer, client, or operator of multiple provider institutions, platforms, applications, enterprises, etc., such that the user has multiple user identifiers and a universal unique identifier. In that regard, the user has an account with each of the multiple provider institutions, platforms, applications, enterprises, etc. The user can own a digital asset in the accounts of the user at the provider institutions, platforms, applications, enterprises, etc.

In some arrangements, a "user" can refer to a set of software codes or a version of a set of software codes. For example, a user can include an ML model (e.g., codes and instructions thereof) or a version of an ML model. In some arrangements, a set of software codes or version of a set of software codes can be written, programmed, trained (updated), validated, verified, or finetuned by a user (e.g., an operator, programmer, and so on). For example, a user can include programmer who has written, programmed, trained (updated), validated, verified, or finetuned an ML model (e.g., codes and instructions thereof) or a version of an ML model. The ML model or a version thereof can be stored in a suitable database or server accessible via a link (e.g., a Uniform Resource Identifier (URI), a Uniform Resource Locator (URL), Uniform Resource Name (URN), etc.). In this case, the digital asset of the user can include a token of the ML model or a version thereof, where the token includes the link to the code (e.g., weights, parameters, etc.) of the ML model or a version thereof. A version of the ML model can be the state of the ML model including its code (e.g., parameters, weights, etc.) and training dataset applied at a given time indicated by a timestamp.

As used herein, a "transaction" generally refers to a transfer of a digital asset of a first user (transferor or sender) to a second user (transferee or receiver), where both the first user and the second user to the transaction are identified by their respective universal unique identifiers. Examples of transactions include transferring the digital asset from a digital wallet of the first user to a digital wallet of the second user, updating an ownership of the digital asset in distributed ledgers or blockchain databases, updating the public-private key pair of the digital asset to include the public key of the second user to be associated with the digital asset, etc.

As used herein, "smart contract" generally refers to a self-executing code (e.g., in a ledger network or other system) that executes when a set of conditions that have been agreed upon by the parties of the smart contract are met. Although the FIGS. and specification generally discuss utilizing smart contracts on funds or digital assets, the systems, methods, and apparatuses disclosed herein can also be used for a plurality of types of non-fungible or fungible assets, such as but not limited to commodities, common shares, options, dollar bills, fiat currency, digital currency, tokens, deeds, leases, wills, other exchanges, non-smart contracts, traditional legal contracts, financial disbursements, taxes, and other types of non-fungible or fungible assets parties use and exchange. Parties to the smart contract for funds or digital assets or other types of non-fungible or fungible assets may be individuals, companies, organizations, entities, providers, the government, and so on.

It should be understood that "real-time" as used herein does not necessarily mean instantaneous, but rather refers to a process or system in which information is updated at a frequency that is suitable for its intended purpose, thus enabling timely responses and decisions based on the most recent data available.

FIG. 1 is a block diagram illustrating an example system 100 for generating and using a universal unique identifier for a user, according to various arrangements. The system 100 includes various networks 101*a*, 101*b*, . . . , 101*n* and a universal resolver 120. The networks 101*a*, 101*b*, . . . , 101*n* can be collectively referred to as networks 101 and individually referred to as a network 101. In the system 100, the universal resolver 120 determines a universal unique identifier for a user who holds an account at or has information stored in each of the networks 101.

Each network 101 can be provided by or for a different provider institution, platform, application, enterprise, etc. For example, each network 101 can be provided by or for a financial institution digital platform, exchange platform, Peer-to-Peer (P2P) trading platform, digital asset trading, custody, and management platform, and so on. A same user may hold an account at or has information stored in each network 101, thus there is a need to uniquely identifier the same user with the same universal unique identifier across the different networks 101.

The network 101*a* includes a computing system 102*a*, user devices 104*a*, and a blockchain registry 106*a*. The network 101*b* includes a computing system 102*b*, user devices 104*a*, and a blockchain registry 106*a*. The network 101*n* includes a computing system 102*n*, user devices 104*n*, and a blockchain registry 106*n*. The computing systems 102*a*, 102*b*, . . . , 102*n* can be collectively referred to as computing systems 102 and individually referred to as a computing system 102. The user devices 104*a*, 104*b*, . . . , 104*n* can be collectively referred to as user devices 104 for the networks 101 or user devices 104 for a network 101. The computing systems 102*a*, 102*b*, . . . , 102*n* can be collectively referred to as computing systems 102 and individually referred to as a computing system 102.

Each network 101 is provided by a respective computing system 102, which can be one or more servers or platforms that is communicably coupled to the user devices 104 for that network 101 to provide digital asset trading, custody, and management services for the users operating the user devices 104. Each user device 104 within the network 101 is operated by a different user. A user can access the services and functions provided by the network 101 and the computing system 102 through operating a respective user device 104 within the network 101. Each user device can execute (e.g., via one or more processors and one or more memories) a client-side application such as a mobile banking application, a browser, a mobile banking application, a mobile or digital wallet, a File Transfer Protocol (FTP) client, digital asset trading or exchange platform application, and so on that can enable transactions of digital assets by the user. The application can also enable custody and management (e.g., tracking and monitoring) of digital assets of the user.

The computing system 102 can execute (e.g., via one or more processors and one or more memories) a server-side application that enable transactions, custody, and management of digital assets by the user. For example, the computing system 102 can manage the storage and security of the user's digital asset as described in further details herein. Through the server-side application, the computing system 102 can store and manage account information of each user, including an account number or name, digital asset information (e.g., asset type, asset identifier, asset value, links to the digital asset, etc.). The computing system 102 can securely store and manage metadata of each user, including name, address, email address, phone number, account number, authentication information (e.g., password, biometric data, etc.).

Each network 101 includes a blockchain registry 106, which is a computing system (e.g., a server) that manages a distributed ledger database/blockchain 108*a* (e.g., one or more blockchains) for storing information. In some examples, the blockchain registry 106 for a given network is part of the computing system 102, such that the same hardware (e.g., processing circuits, network interface circuits, etc.) can be used to implement both the computing system 102 and the blockchain registry 106*a*. In other examples, the blockchain registry 106 and the computing system 102 are implemented using separate hardware and are communicably coupled via a communication network, and the blockchain registry 106 and the computer system 102 are managed by separate entities. In some arrangements, the blockchain registry 106 is configured to store and manage information of the user, including identifiers of users (e.g., a user identifier of each user in the network 101, the universal unique identifier, etc.), the digital asset information of each user, the metadata of each user, and so on the distributed ledger database/blockchain 108.

The distributed ledger database/blockchain 108 can store the information of the users in various suitable manners. In some examples, at least one blockchain or blocks in a blockchain are dedicated specifically for storing identifiers of the users, including the universal unique identifiers, user identifiers specific to a network 101, and so on. In such examples, each block dedicated to storing identifiers can store identifiers of a number of users, e.g., a block can store one or more identifiers of a first user, one or more identifiers of a second user, . . . , one or more identifier of an nth user, and so on.

In some examples, a blockchain of the distributed ledger database/blockchain 108 can store identifiers of the users as well as one or more of the digital asset information or the metadata of the users. In some instances, a block can store information of only one user, and the information of that user can be stored in one or more blocks (multiple blocks if the size of one block is insufficient). For example, a block can store the identifiers of the user as well as one or more of the digital asset information or the metadata of the user. In other instances, a block can store the identifiers of multiple users as well as one or more of the digital asset information or the metadata of the multiple users.

In some arrangements, a computing system 102 can determine or allocate a user identifier to identify each user in the network 101. The computing system 102 can execute a suitable protocol for determining the user identifiers within its network 101. In some arrangements, the user identifier can include DIDs. DIDs is a data structure for verifiable and decentralized identifiers for users (e.g., persons), organizations, data models (e.g., ML models or versions thereof), and so on. Recent trends suggest that DIDs are popular in networks 101 due to DID being designed separate from centralized authorities (e.g., governments) such that only the controller or issuer of a DID and not any third party authority need to prove control of the DID. In some examples, each DID includes a link (e.g., URI) that associates a DID subject with a data structure referred to as a DID document. In some examples, the DID subject is a user (e.g., an individual, an organization, or a data model such as ML models or versions thereof). In some examples, the DID subject is a digital asset (e.g., token) of a user. The DID document includes information such as cryptographic materials, verification methods, services, and so on to allow a DID controller to prove control of a DID. An example DID document can include a DID, a set of public keys for verification, a set of authentication methods for authentication (methods of cryptographically authenticating a DID controller), a set of service endpoints for interaction, a timestamp for audit history, and a signature for integrity. The services allow trusted interactions for the DID subject. In some examples, the DID data structure includes a text string with characters corresponding to a scheme, a DID method, and a DID method-specific identifier. The text string can resolve to a corresponding DID document. A DID method specifies operations in which a DID (e.g., DID document) is created.

In some arrangements, each network 101, each computing system 102, or each provider institution, platform, application, or enterprise associated therewith can be identified by an identifier. In the examples in which a network 101 or computing system 102 is deployed by a provider institution, the provider institution, the network 101, and the computing system 102 can be identified by a provider institution identifier, an example on which is a DID. The blockchain registry 106*a* can allocate a block of a blockchain to record the identifier (e.g., the provider institution identifier) of the network 101, computing system 102, provider institution, platform, application, or enterprise. In some examples, at least one user identifiers for a same network 101 and the identifier of the network 101 are stored in a same blockchain or a same block of a blockchain. Therefore, the blockchain registry 106 can record the DIDs of users in the network 101 and the DID of the network 101, computing system 102, provider institution, platform, application, or enterprise.

In some arrangements, a universal unique identifier based on DIDs of a same user from different networks. In some arrangements, a universal unique identifier based on DIDs of a same user from different networks and identifiers (e.g., provider institution identifiers or DIDs) of those networks. As compared to traditional centralized universal identifier schemes where an identifier is generated (e.g., by a government authority) irrespective of any identifiers of any users or networks 101, the arrangements described herein to allow the networks 101 employing DIDs to retain the benefits of the network-specific DIDs while also gaining the benefits of a cross-network, cross-chain universal unique identifier to allow users to be identified in transactions between two or more networks. Given that the universal unique identifier as described herein is determined using the DIDs from the various networks, as long as the networks themselves can prove control of the DIDs, those networks can also prove joint control over the universal unique identifiers generated using the DIDs. There is no centralized authority that issues any identifier from the top.

Within a network 101, the computing system 102, the user devices 104, and the blockchain registry 106 can communicate with each other over one or more communication networks. The networks 101 (e.g., the computing systems 102, the blockchain registries 106, and the user devices 104) can communicate with each other over one or more communication networks. The networks 101 (e.g., the blockchain registries 106) and the universal resolver 120 can communicate with each other over one or more communication networks. A communication network can be any suitable Local Area Network (LAN), Wide Area Network (WAN), or a combination thereof. For example, the communication network can be supported by Frequency Division Multiple Access (FDMA), Time Division Multiple Access (TDMA), Code Division Multiple Access (CDMA)

(particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. A communication network is structured to permit the exchange of data, values, instructions, messages, and the like.

The universal resolver 120 can generate the universal unique identifier. The universal resolver 120 includes at least one processing circuit 122 and a distributed ledger database/blockchain 130. In some arrangements, each processing circuit 122 includes at least one processor 124 and at least one memory 126. The processor 124 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 126 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 126 is or includes tangible, non-transient volatile memory or non-volatile memory. Accordingly, the memory 126 includes database components, object code components, script components, or any other type of information structure for supporting the various activities and information structures described herein. The processing circuit 122 can be used to implemented one or more of the circuits 128 and 130. The computing system 102, the user device 104, and the blockchain registry 106 each includes a processing circuit such as the processing circuit 122.

The network interface circuit 128 is configured for and structured to establish a connection and communicate with the network 101*a* (e.g., the blockchain registry 106*a*), the network 101*b* (e.g., the blockchain registry 106*b*), . . . , and the network 101*n* (e.g., the blockchain registry 106*n*) via the network. The network interface circuit 128 is structured for sending and receiving data over a communication network (e.g., the network over which the communication session 120 is established) or a physical connection (e.g., via a physical connector such as Universal Serial Bus (USB)). Accordingly, the network interface circuit 128 includes any of a cellular transceiver (for cellular standards), wireless network transceiver (for 802.11X, ZigBee, Bluetooth, Wi-Fi, or the like), wired network interface, or a combination thereof. For example, the network interface circuit 128 may include wireless or wired network modems, ports, baseband processors, and associated software and firmware. The computing system 102, the user device 104, and the blockchain registry 106 each includes a network interface circuit such as the network interface circuit 128.

The universal resolver 120 (e.g., at least one processing circuit 122) manages a distributed ledger database/blockchain 130 (e.g., one or more blockchains) for storing the universal unique identifiers of users of the networks 101. The distributed ledger database/blockchain 130 can store the universal unique identifiers and the corresponding user identifiers of the different networks of the users in various suitable manners. In some examples, at least one blockchain or blocks in a blockchain are dedicated specifically for storing identifiers of users, including the universal unique identifiers, user identifiers specific to a network 101, and so on. In such examples, each block dedicated to storing identifiers can store identifiers of a number of users, e.g., a block can store one or more identifiers of a first user, one or more identifiers of a second user, . . . , one or more identifier of an nth user, and so on of a same network 101. In some examples, a blockchain or a block of a blockchain can store the identifiers (e.g., the universal unique identifiers, user identifiers specific to networks 101, etc.) of users in different networks 101.

In some arrangements, the universal resolver 120 (e.g., at least one processing circuit 122) is configured to generate and manage the distributed ledger database/blockchain 130 (e.g., one or more blockchains, one or more distributed ledgers, one or more DLT networks, and so on). To generate the distributed ledger database/blockchain 130, the universal resolver 120 can execute a series of instructions for initializing the distributed ledger database/blockchain 130. This can include allocating network resources (e.g., memory, processing power) and setting up network parameters like consensus protocols and cryptographic keys. Additional nodes on the network (not shown) are then instantiated, each running an instance of the distributed ledger database/blockchain 130 and maintaining its state. In case that information stored in a previously allocated and filled block of the blockchain is modified, updated, or added (e.g., a universal unique identifier is determined as described herein), a new block of the blockchain is allocated to include the modified, updated, or added information, as well as any information that is not modified or updated.

Some arrangements relate to generating the universal unique identifier for a user. At 110*a*, the computing system 102*a* assigns a user identifier (e.g., a DID) to a user operating each of the user devices 104*a*. The computing system 102*a* can generate the user identifier using any suitable protocol (e.g., DID protocol). An example of the user identifier includes a DID text string including characters corresponding to a scheme, a DID method, and a DID method-specific identifier. The computing system 102*a* can assign the user identifier to the user when the user registers for the services provided by the computing system 102 or the network 101*a*, e.g., through an account opening process. Different users and user devices 104*a* are provided with different user identifiers. The computing system 102*a* can provide (e.g., send) a different user identifier to each of the user devices 104*a* via a communication network.

At 112*a*, the computing system 102*a* provides an identifier of the computing system 102*a* (e.g., a provider institution identifier) to the blockchain registry 106*a*. For example, the computing system 102*a* can send the provider institution identifier to the blockchain registry 106*a* via a communication network. At 114*a*, each user device 104*a* provides its user identifier to the blockchain registry 106*a*. For example, each user device 104*a* can send the user identifier to the blockchain registry 106*a* via a communication network. The blockchain registry 106*a* can store the provider institution identifier and the user identifiers on the distributed ledger database/blockchain 108*a* in the manner described.

Similar operations are performed in the networks 101*b* to 101*n*. In network 101*b*, the computing system 102*b* assigns a user identifier (e.g., a DID) to a user operating each of the user devices 104*b* similar to 101*a*. At 112*b*, the computing system 102*b* provides an identifier of the computing system

102*b* (e.g., a provider institution identifier) to the blockchain registry 106*b*, similar to 112*a*. At 114*b*, each user device 104*b* provides its user identifier to the blockchain registry 106*b*, similar to 114*a*. The blockchain registry 106*b* can store the provider institution identifier and the user identifiers on the distributed ledger database/blockchain 108*b* in the manner described.

In network 101*n*, the computing system 102*n* assigns a user identifier (e.g., a DID) to a user operating each of the user devices 104*n* similar to 101*a*. At 112*n*, the computing system 102*n* provides an identifier of the computing system 102*n* (e.g., a provider institution identifier) to the blockchain registry 106*n*, similar to 112*a*. At 114*n*, each user device 104*n* provides its user identifier to the blockchain registry 106*n*, similar to 114*a*. The blockchain registry 106*n* can store the provider institution identifier and the user identifiers on the distributed ledger database/blockchain 108*n* in the manner described.

Each blockchain registry 106*a*, 106*b*, . . . , 106*n* of the networks 101*a*, 101*b*, . . . , 101*n* can provide the provider institution identifier and the user identifiers of the respective networks 101*a*, 101*b*, . . . , 101*n* to the universal resolver 120 for generating the universal unique identifier. While generating the universal unique identifier for a user is described herein as an example, universal unique identifiers for other users of the networks 101 can be similarly determined.

At 131, the blockchain registry 106*a* provides (sends over a communication network) to the universal resolver 120 the provider institution identifier and the user identifier of the user specific to the first network 101*a*, at 132, the blockchain registry 106*b* provides (sends over a communication network) to the universal resolver 120 the provider institution identifier and the user identifier of the user specific to the second network 101*b*, . . . , and at 134, the blockchain registry 106*n* provides (sends over a communication network) to the universal resolver 120 the provider institution identifier and the user identifier of the user specific to the nth network 101*n*.

The universal resolver 120 (e.g., the processing circuit 122) resolves the identity of the user to associate or map the received the user identifiers from different networks 101 to a same user, such that PII of the user is not exposed outside of the in-network distributed databased ledger 108 and not exposed to the universal resolver 120. In some arrangements, along with the provider institution identifier and the user identifier, the blockchain registry 106 in each network 101 further provides a hash of metadata of the user. The structure, syntax, and type of the metadata of the user are predetermined, such that different networks 101 can select the same metadata. In one example, the metadata includes strings of the name of the user, an address of the user, and the telephone number of the user, concatenated in any order. Other types of metadata can be used. Given that information of the user that is known across different networks 101 may include PII, to protect the PII, a hash of the metadata is generated by the blockchain registry 106 in each network 101. The hash algorithm and parameters are predetermined, such that the output hashes of the same metadata across different networks 101 are the same. The output hash is used by the universal resolver 120 to identify the user across the different networks 101. That is, the user identifiers and provider institution identifiers associated with or received with the same output hash belong to the same user. In some examples, the universal resolver 120 includes a secure enclave environment for identity resolution, e.g., for processing the hash of metadata of the users.

The universal resolver 120 (e.g., the processing circuit 122) determines the universal unique identifier based at least in part of the provider institution identifiers of the networks 101 and the user identifiers assigned to the user for the networks 101. The universal resolver 120 can manipulate the strings of the provider institution identifiers of the networks 101 and the user identifiers assigned to the user for the networks 101 to generate the universal unique identifier. In other words, the universal resolver 120 can derive the universal unique identifier using the provider institution identifiers of the networks 101 and the user identifiers assigned to the user for the networks 101.

In some arrangements, the universal unique identifier includes the concatenation of the strings of the provider institution identifiers of the networks 101 and the user identifiers assigned to the user for the networks 101. In some examples, each provider institution identifier or each user identifier is the entire DID string (including strings corresponding to the scheme, the DID method, and the DID method-specific identifier) or only the string corresponding to the DID method-specific identifier. Concatenation is employed in such arrangements to allow any inspection to the universal unique identifier to determine its constituent DIDs. Given that DIDs have a predetermined structure (e.g., strings corresponding to schemes, followed by strings corresponding to DID method, followed by strings corresponding to DID method-specific identifier)

In some arrangements, the universal resolver 120 can concatenate the institution identifier for the network 101*a*, the user identifier of the user in the network 101*a*, the institution identifier for the network 101*b*, the user identifier of the user in the network 101*b*, . . . , the institution identifier for the network 101*n*, and the user identifier of the user in the network 101*n*, in any suitable order, to generate the universal unique identifier. In some examples, the institution identifier in a network 101 and the user identifier of the user in the same network 101 are immediately adjacent to one another as concatenated in the universal unique identifier, to indicate the relationship that those identifiers are for a same network. In some examples, one or more predetermined filler string characters (e.g., "x") can be placed before an identifier, after an identifier, or between two identifiers as concatenated in the universal unique identifier. In some examples, the result of concatenating the identifiers are run through a mathematical function (e.g., a hash function such as a one-way hash function), the output of which is the universal unique identifier.

In some arrangements, the universal resolver 120 can concatenate a hash of the institution identifier for the network 101*a*, a hash of the user identifier of the user in the network 101*a*, a hash of the institution identifier for the network 101*b*, a hash of the user identifier of the user in the network 101*b*, . . . , a hash of the institution identifier for the network 101*n*, and a hash of the user identifier of the user in the network 101*n*, in any suitable order, to generate the universal unique identifier. In some examples, a hash of the institution identifier in a network 101 and a hash of the user identifier of the user in the same network 101 are immediately adjacent to one another as concatenated in the universal unique identifier, to indicate the relationship that those identifiers are for a same network. In some examples, one or more predetermined filler string characters (e.g., "x") can be placed before an identifier, after an identifier, or between two identifiers as concatenated in the universal unique identifier. In some examples, the result of concatenating the hashes of identifiers are run through another mathematical function (e.g., a hash function such as a one-way hash function), the output of which is the universal unique identifier.

The universal resolver 120 can record the universal unique identifier of the user and the constituent provider institution identifiers and user identifiers in the distributed ledger database/blockchain 130, to be made available for verification and audit purposes. In some arrangements, in response to determining the universal unique identifier for a user, the universal resolver 120 (e.g., the processing circuit 122) allocates a new block in a block in the distributed ledger database/blockchain 130 (e.g., a blockchain) and stores the universal unique identifier of the user, the constituent provider institution identifiers (e.g., DIDs for the provider institutions), and one or more of a timestamp corresponding to time at which each identifier is received from a blockchain registry 106 or a timestamp corresponding to the time at which the universal unique identifier is generated. This new block contains the relevant information for generating the universal unique identifier for the user, and the content of the block can be hashed and then cryptographically signed using a private key of the universal resolver 120. An entity auditing the generation of the universal unique identifier can verify the content of this block by verifying the signature on the block using the public key of the universal resolver 120. In some examples, a block of the distributed ledger database/blockchain 130 includes such information for two or more users. In some examples, such information for a user can be stored in two or more blocks of the distributed ledger database/blockchain 130.

At 140, the universal resolver 120 provides (sends over a communication network) to the blockchain registries 106 the universal unique identifier for the user. Each blockchain registry 106 can store the universal unique identifier for the user in the distributed ledger database/blockchain 108*a*. In some examples, at least one blockchain or blocks in a blockchain of a blockchain registry 106 are dedicated specifically for storing universal unique identifier of users. In such examples, each block of the blockchain or of the blocks dedicated to storing the universal unique identifiers can store the universal unique identifiers of a number of users, e.g., a block can store one or more of universal unique identifier of a first user, universal unique identifier of a second user, . . . universal unique identifier of an nth user, and so on of a same network 101.

In some examples, the blockchain registry 106 can include, in a block in which the universal unique identifier of a user is stored, a link, address, or identifier of each of other blocks in which information such as the user identifier, the digital asset information, or the metadata of the user are stored. The block and the other blocks can be on the same blockchain or different blockchains. In some examples in which the user identifier, the universal unique identifier, the digital asset information, and the metadata of the same user are stored in two or more blocks in the distributed databased ledger 108, each of the two or more blocks includes a link, address, or identifier of each of the other ones of the two or more blocks, such that the user information and user identifiers, particularly both the user identifier and the universal unique identifier, are linked. In some examples, each block that stores any of the user identifier, the universal unique identifier, the digital asset information, and the metadata of a user includes a link, address, or identifier of a block in which the provider institution identifier is stored.

In some examples, in response to receiving the universal unique identifier of a user, the blockchain registry 106 allocates a new block to contain the received universal unique identifier of the user and information (e.g., one or more of user identifier, digital asset information, and metadata) of the user that is stored in a previous block. The previous block is updated by the new block, and the previous block is nullified. The previous block and the new block can be on the same blockchain or different blockchains.

Figure 2:
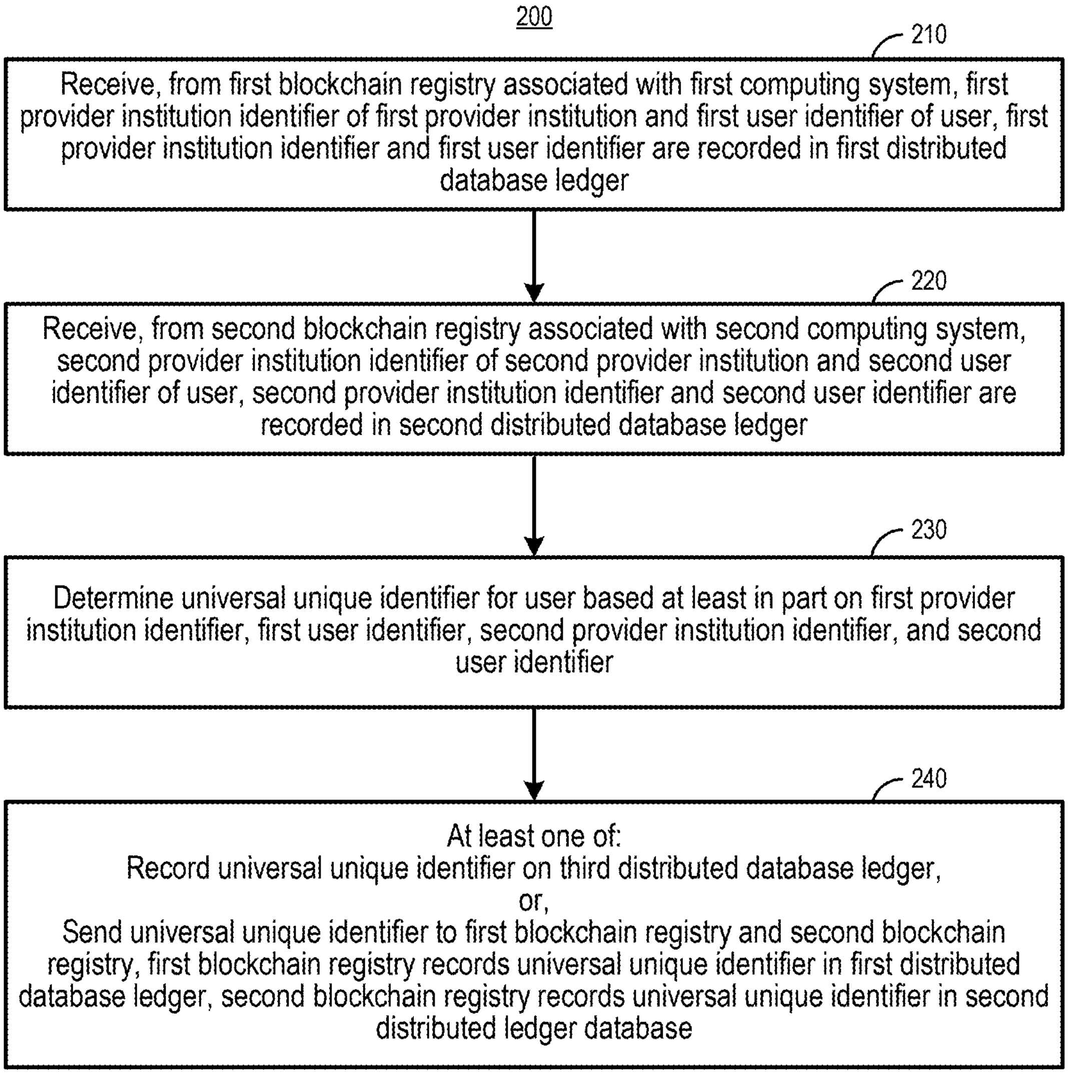
FIG. 2 is a flowchart diagram illustrating an example method for generating and using a universal unique identifier for a user, according to various arrangements.

FIG. 2 is a flowchart diagram illustrating an example method 200 for generating and using a universal unique identifier for a user, according to various arrangements. The method 200 can be performed in the system 100, for example, by the universal resolver 120 (e.g., by one or more processors). The flow illustrated in FIG. 1 is an example implementation of the method 200.

At 210, the universal resolver 120 receives, from a first blockchain registry (e.g., the blockchain registry 106*a*) associated with a first computing system (e.g., the computing system 102*a* in the network 101*a*), a first provider institution identifier of a first provider institution and a first user identifier of a user. The first provider institution identifier and the first user identifier are recorded in a first distributed ledger database/blockchain (e.g., recorded by the blockchain registry 106*a* in the distributed ledger database/blockchain 108*a*). In some examples, the first provider institution identifier includes a DID of the first provider institution. The first user identifier includes a first DID of the user. The first user identifier is determined by the first computing system.

At 220, the universal resolver 120 receives, from a second blockchain registry (e.g., the blockchain registry 106*b*) associated with a second computing system (e.g., the computing system 102*b* in the network 101*b*), a second provider institution identifier of a second provider institution and a second user identifier of the same user. The second provider institution identifier and the second user identifier are recorded in a second distributed ledger database/blockchain (e.g., recorded by the blockchain registry 106*b* in the distributed ledger database/blockchain 108*b*). In some examples, the second provider institution identifier includes a DID of the second provider institution. The second user identifier includes a second DID of the user. The second user identifier is determined by the second computing system At 230, the universal resolver 120 determines a universal unique identifier for the user based at least in part on the first provider institution identifier, the first user identifier, the second provider institution identifier, and the second user identifier. In some examples, determining the universal unique identifier for the user includes concatenating the first provider institution identifier, the first user identifier, the second provider institution identifier, and the second user identifier, in a suitable order. In some examples, determining the universal unique identifier for the user includes running the first provider institution identifier, the first user identifier, the second provider institution identifier, and the second user identifier in at least one mathematical function (e.g., at least one hash function).

In some examples, the user includes a customer of the first provider institution and the second provider institution. In some examples, the user includes an ML model. In some examples, the user includes a version of an ML model.

In some examples, the universal resolver 120 receives a hash of first metadata of the user from the blockchain registry 106*a* or the first computing system, the universal resolver 120 receives a hash of second metadata of the user from the blockchain registry 106*b* or the second computing system. The universal resolver 120 determines that the first user identifier and the second user identifier are for the same user based on the hash of the first metadata and the hash of the second metadata (e.g., the hashes being the same). The first metadata and the second metadata exclude PII of the user. In some examples, the universal resolver 120 applies secure enclave environment for identity solution.

At 240, the universal resolver 120 records the universal unique identifier on a third distributed ledger database/blockchain (e.g., the distributed ledger database/blockchain 130) and/or send the universal unique identifier to the first blockchain registry and the second blockchain registry. The first blockchain registry records the universal unique identifier in the first distributed ledger database/blockchain. The second blockchain registry records the universal unique identifier in the second distributed ledger database/blockchain.

In some arrangements, the first provider institution identifier is stored in a first block of a blockchain of the first distributed ledger database/blockchain (e.g., the distributed ledger database/blockchain 108*a*). The first user identifier is stored in a second block of the blockchain of the first distributed ledger database/blockchain. The universal unique identifier is stored in a third block of the blockchain of the first distributed ledger database/blockchain. The third block includes a link to or an address of each of at least one of the first block or the second block.

In some arrangements, the first provider institution identifier is stored in a first block of a blockchain of the first distributed ledger database/blockchain (e.g., the distributed ledger database/blockchain 108*a*). The first user identifier and the universal unique identifier are stored in a second block of the blockchain of the first distributed ledger database/blockchain. The second block includes a link to or an address of the first block.

The universal unique identifier can be provided to identify that the digital assets of a user belong to the user. In some examples, the digital asset (e.g., a token) can include a metadata field corresponding to the universal unique identifier of the user. In some examples, the digital asset (e.g., a token) can include a metadata field corresponding to a link, address, or identifier of the block on a blockchain of the distributed ledger database/blockchain 108 storing the universal unique identifier of the user. In some examples, the digital asset (e.g., a token) can include a first metadata field corresponding to the universal unique identifier of the user and the second metadata field corresponding to the user identifier assigned by the network 101. In some examples, the digital asset (e.g., a token) can include a first metadata field corresponding to a link, address, or identifier of the block on a blockchain of the distributed ledger database/blockchain 108 storing the universal unique identifier of the user and the second metadata field corresponding to a link, address, or identifier of the block on a blockchain of the distributed ledger database/blockchain 108 storing the user identifier assigned by the network 101. In some examples, a party can identify a public key of the user by looking up the public key according to the universal unique identifier in a mapping table that maps public keys to universal unique identifiers. The public key of the user can be used to verify the digital signature on the digital asset to verify ownership of the digital asset.

In some arrangements, in response to receiving the universal unique identifier for a user, the blockchain registry 106 or the computing system 102 updates each digital asset owned by the user with the universal unique identifier. For example, the blockchain registry 106 or the computing system 102 generates a new digital asset (e.g., a token) to mirror a previously generated digital asset, with all the same digital asset information (e.g., asset type, asset identifier, asset value, links to the digital asset, etc.), fields, metadata fields, and so on, while adding the metadata field corresponding to the universal unique identifier or a link, address, or identifier of the block on a blockchain of the distributed ledger database/blockchain 108 storing the universal unique identifier. The content of the new digital asset (e.g., a hash thereof) is signed using the private key of the user. In the examples in which the digital asset of the user is stored in a blockchain of the distributed ledger database/blockchain 108, the new digital asset (with the original content and the universal unique identifier of the user) is stored in a newly allocated block different from the block on which the previously generated digital asset is stored. The block storing the previously generated digital asset or an entry corresponding to the previously generated digital asset in the block is nullified.

The method 200 can be likewise implemented on an identifier (e.g., a DID) identifying a digital asset (e.g., a token). In such arrangements, the blockchain registries 106 of the different networks 101 provides the provider institution identifiers (e.g., provider institution DIDs) and asset identifiers (e.g., asset DIDs) to the universal resolver 120. The method 200 proceeds with the asset identifiers instead of user identifiers, to generate the universal unique identifier of the digital asset. The universal unique identifier of the digital asset is provided back to the respective blockchain registries 106, and the digital assets are updated in the manner described to include the universal unique identifier.

Figure 3:
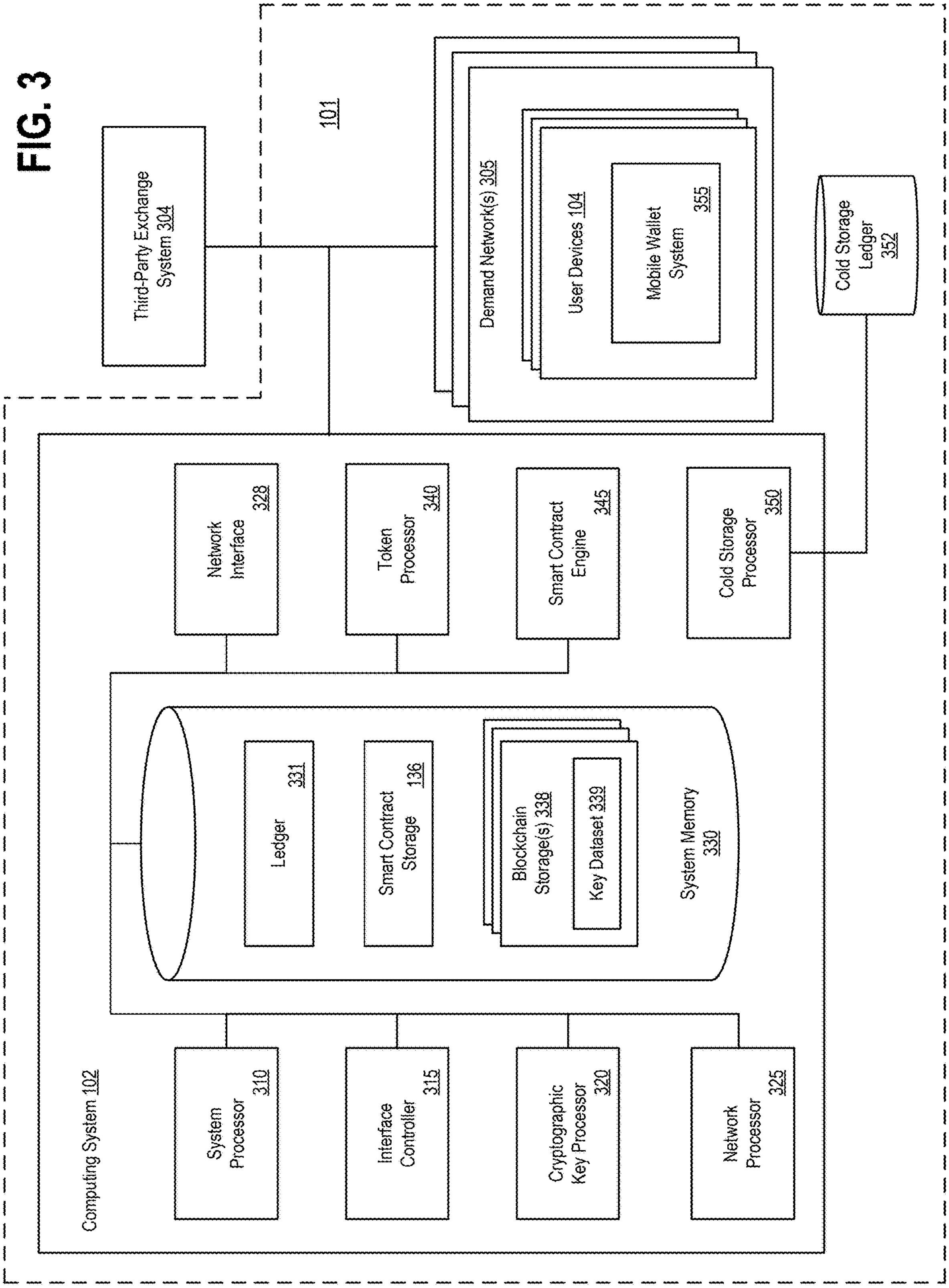
FIG. 3 is a block diagram illustrating an example network and a third-party exchange system, according to various arrangements.

FIG. 3 is a block diagram illustrating an example network 101 and a third-party exchange system 304, according to various arrangements. The network 101 includes the computing system 102, the user devices 104, and the blockchain registry 106 (not shown). The computing system 102, the user devices 104, and the third-party exchange system 304 can communicate via the communication network.

The computing system 102 can include a physical hardware (e.g., at least one processing circuit such as the processing circuit 122) operatively coupled or that can be coupled with one or more components of the computing system 102. The computing system 102 can include a virtual computing system, an operating system, and a communication bus to effect communication and processing. The computing system 102 can include a system processor 310, an interface controller 315, a cryptographic key processor 520, a network processor 325, a network interface 328, system memory 330, a token processor 340, a smart contract engine 345, and a cold storage processor 350. The at least one processing circuit of the computing system 102 can implement each of these components.

The system processor 310 can execute one or more instructions associated with the computing system 102. The system processor 310 can include an electronic processor, an integrated circuit, or the like including one or more of digital logic, analog logic, digital sensors, analog sensors, communication buses, volatile memory, nonvolatile memory, and the like. The system processor 310 can include, but is not limited to, at least one microcontroller unit (MCU), microprocessor unit (MPU), central processing unit (CPU), graphics processing unit (GPU), physics processing unit (PPU), embedded controller (EC), or the like. The system processor 310 can include a memory operable to store or storing one or more instructions for operating components of the system processor 310 and operating components operably coupled to the system processor 310. For example, the one or more instructions can include one or more of firmware, software, hardware, operating systems, embedded operating systems. The system processor 310 and the computing system 102 generally can include one or more communication bus controller to effect communication between the system processor 310 and the other elements of the computing system 102.

The interface controller 315 can link the computing system 102 with one or more of the other networks 101, the user devices 104, and the third-party exchange system 304, by one or more application interfaces or protocol. An application interface can include, for example, an application programming interface ("API") compatible with a particular component of the computing system 102, the user devices 104, or the third-party exchange system 304. The communication interface can provide a particular communication protocol compatible with a particular component of the computing system 102 and a particular component of the user devices 104 or the third-party exchange system 304. The interface controller 315 can be compatible with particular tokens and can be compatible with particular metadata delivery systems corresponding to particular tokens. For example, the interface controller 315 can be compatible with payment processing transmissions or ML model transfers by a protocol compatible with payment processing latency and encryption structures.

The interface controller 315 can establish a data channel between a source address and a destination address, such that receivals or transmissions of a token occurs between the addresses on a ledger (e.g., the blockchain storages 338) and/or a digital wallet (e.g., provided by the mobile wallet system 355 of each user device 104). An address can be generated based on executing, by the cryptographic key processor 520, a math-based function (e.g., hash, symmetric encryption, asymmetric encryption) on a public key of a public and private key pair (or a verification key of a verification and signing key pair). For example, if the interface controller 315 receives a token from any system or device described herein, the token or other data received may include metadata associated with a source address, and the interface controller 315 may determine a destination address (e.g., may be provided to the system sending the token in advance) to store the token in the blockchain storage 338. In various arrangements, the addresses may be a unique sequence of randomized (or pseudo-randomized) numerical digits, characters, punctuation, whitespace, code (e.g., QR), or symbols.

The interface controller 315 can establish a data channel between a source network address and a destination network address, such that receivals or transmissions of a token occurs between the networks (e.g., demand networks 305) on the leger 331 (e.g., a storage) or the blockchain storages 338 and/or the digital wallet. The source network and the destination address can be generated based on executing, by the cryptographic processor 320, the math-based function on a public key of a public and private key pair and executing, by the network processor 325, a securitization engine to securely connect to the source demand network and the destination demand network. For example, if the interface controller 315 receives a token from a network described herein, the token or other data received may include metadata associated with a source network address and establish a secure connection with the destination network address (e.g., provided by the metadata) to store the token in the blockchain storage 338.

The cryptographic key processor 520 can generate and modify cryptographic keys. For example, the cryptographic key processor 520 can include one or more asymmetric or symmetric key generators and can generate public-private key pairs. For example, a public-private key pair can include a public key configured to encrypt in accordance with a particular transform process. For example, a public-private key pair can include a private key configured to decrypt in accordance with a particular transform process compatible with the public key. In some arrangements, the cryptographic key processor 520 can link the public-private key pair with any individual object or component. In some arrangements, the cryptographic key processor 520 can link any public key or private key corresponding to the public-private key pair with any individual object or component. For example, the cryptographic key processor 520 can generate a key compatible with or linked with a particular identifier corresponding to a particular, device, user, customer, account, system, or any combination thereof.

Upon receiving a token, the cryptographic key processor 520 can identify a public key associated with the token, for example, looking up the public key according to the universal unique identifier (embedded in the token directly or via a link in the token) in a mapping table that maps public keys to universal unique identifiers. Upon identifying one or more private keys of the token, the cryptographic key processor 520 can verify the token using the one or more identified public keys. In some arrangements, the token may have been previously stored on the distributed ledger database/blockchain 108*a* and the public-private key pairs may be stored throughout the computing system 102 (e.g., in the blockchain storages 338, a cold storage ledger 352, etc.). In some arrangements, the received token may be an external token stored on a storage medium or a cache remote from the computing system 102 (e.g., a digital wallet, a crypto-wallet, other storage mediums or caches, etc.), such as on the user devices 104 or the third-party exchange system 304.

In some arrangements, the cryptographic key processor 520 can sign the token using a private key and verify the token using a public key. For example, signing the token can include using a specific private key to create a digital signature (e.g., biometric scan, fingerprint capture, passcode verification, etc.), and verifying the token can include decrypting the token using a specific public key to verify the digital signature of the specific private key, or an address of the specific private key. The address of the specific private can be a hashed version of the specific private key based on a hash function (e.g., hash table, hash map). The public and private keys may be symmetric (e.g., use the same key to sign/verify) or asymmetric (e.g., use different keys to sign/verify). In some arrangements, an algorithm (e.g., a hash algorithm, etc.) can be applied to a private key to generate a public key.

Generating private and public keys can include concatenating multiple public-private key pairs into a single public-private key pair based on merging, using a math-based function, multiple key pairs. For example, a wallet public key or wallet public-private key pair can be provided by the mobile wallet system 355 with a token (e.g., for deposit). The cryptographic key processor 520 can generate a new internal public-private key pair prior to storing the token. The math-based function can be, but is not limited to, a Rivest-Shamir-Adleman, elliptic curve cryptography, Digital Signature Algorithm, asymmetric algorithm, hash algorithm or function, or symmetric algorithm, and so on. For example, executing the math-based function can include generating (or aggregating) a concatenated public key based on executing a concatenation of the wallet public key and the additional public key and hashing, utilizing salting, the concatenated public key based on a hash function, where salting includes providing random data and the concatenated public key as input to the hash function. In particular, the "salt" can be random data such as random bits that is used as an additional input to a one-way function such as a hashes or encryption algorithm. A new salt can be randomly generated by the cryptographic key processor 520 each time salting occurs. Salting can occur based on a preference of a user depositing the token or in response to analyzing metadata of the token (e.g., based on value of the token or data stored in a metadata object).

In some arrangements, the cryptographic key processor 520 can also be configured to generate public and private key pairs and the interface controller 315 can be configured to provide public keys (or public and private key pairs, or private keys) to one or more computing devices (e.g., the user devices 104, etc.) for use in a token collateral request. The interface controller 315 can interface (e.g., using an API) with one or more other ledger systems (other blockchain ledgers) and wallets (e.g., digital, crypto, etc.). In various arrangements, the public and private key pair can be generated based on a cryptographic function (e.g., symmetric-key algorithms (Data Encryption standard (DES), Advanced Encryption Standard (AES), etc.), asymmetric-key algorithms (Ed25519 signing, Elliptic Curve Cryptography (ECC), etc.), public-key algorithms (Rivest-Shamir-Adleman (RSA), etc.), etc.) and be stored in the computing system 102. In various arrangements, the keys of the public and private key pairs may be stored in separate locations. For example, public keys may be stored in the key dataset 339 and the private keys may be stored in a cold storage ledger 352. In some arrangements, the public and private key pairs may be stored together (as one data package) in the key dataset 339. In some arrangements, the computing system 102 can maintain (e.g., store and access keys) the key dataset 339 such that each token may be locked-unlocked and associated with a public key or public-private key pair stored on the key dataset 339. In various arrangements, public-private key pairs can be shared amongst a plurality of tokens or can be unique to each token on the blockchain storage 338.

The network processor 325 can be configured to execute the securitization engine on the demand networks 305. The securitization engine can convert illiquid assets into marketable securities within the demand networks 305. For example, a network processor 105 can execute a securitization engine on transactions between one or more demand networks 305. The network processor 325 can enforce permissions corresponding to each demand network 305. For example, a demand network 305 may only accept transactions where assets correspond to a loan. A network processor 325 can prevent non loan transactions from occurring in the demand network 305. In some arrangements, the network processor 325 can verify public and private keys generated by the cryptographic key processor 520 associated with the demand networks 305.

The system processor 310 can receive a request including a tokenized deposit. The tokenized deposit can include asset tokens and a plurality of owners for the demand network 305. For example, a user device 104 can use a network interface to submit a request with a tokenized deposit. The tokenized deposit can include asset tokens and one or more owners for a demand network 305. The system processor 310 can transmit the request to the network processor 325 to cause the network processor 325 to create one or more users based on the plurality of owners and create the mobile wallet systems 355 on the user devices 104 of the users based on the tokenized deposit within the request. The user devices 104 can store the asset tokens, a type for the asset tokens, and an identification for the owner (e.g., the universal unique identifier, the user identifier) in metadata object of the user devices 104.

The network processor 325 can create one or more demand networks 305 within a main network in the computing system 102. For example, a network interface 328 can receive a request to create a demand network 305. The network interface 328 can transmit the request to the network processor 325 to create the demand network 305. The demand network 305 can include a blockchain with a set of protocols and a plurality of nodes (e.g., user devices 104). For example, a demand network 305 can include three user devices 104, where a protocol in the demand network 305 require the assets to only include bonds. In another example, a demand network 305 can include five user devices 104, where a protocol in the demand network 305 require the assets to only include loans and credit funds.

The demand networks 305 can each include a type for the network. The type for the network can be a classification for the owners of the demand networks 305. The type can be at least one of funds, corporates, investors, financial institutions, asset managers, or partners. For example, a demand network 305 can have a type of funds. The funds type indicates that the demand network 305 has a funds classification for the owners. In another example, a demand network 305 can have a type of institution. The funds type indicates that the demand network 305 has an institution classification for the owners. In another example, a demand network 305 can have a type of investor. The funds type indicates that the demand network 305 has an investors classification for the owners.

The demand networks 305 can include one or more permissions and a plurality of clients associated with the user devices 104. The one or more permissions can limit the plurality of owners from accessing other demand networks 305. For example, clients in one demand network 305 cannot access clients in another demand network. In this manner, the one or more permissions ensure privacy amongst the demand networks 305. In order to access other demand networks 305, a request may be sent from a user device 104 to a main network to broadcast the request. The demand networks 305 can notify the clients system of the broadcasted request to provide temporary access to the demand network 305 of the request.

The user devices 104 (e.g., computing system, device, etc.) may be a mobile computing device, desktop computer, smartphone, tablet, smart watch, smart sensor, or any other device configured to facilitate receiving, displaying, and interacting with content (e.g., web pages, mobile applications, such as decentralized application (dApp), etc.). The user devices 104 may include an input/output circuit for communicating data over the communication network to the computing system 102 and/or the third-party exchange 104. In some arrangements, each of the user devices 104 can have a digital wallet address for exchanging (e.g., receiving or sending) fungible or non-fungible values (e.g., cryptocurrency, digital currency, stocks, bonds, loan, deed, etc.).

The user devices 104 can include a computing system located remotely from the computing system 102. The user devices 104 can include a mobile wallet system 355. The mobile wallet system 355 can include an interface to execute instructions corresponding to a particular wallet account, and to modify the structure or contents of a particular smart contract corresponding to a wallet account. For example, the mobile wallet system 355 can include a user interface to receive input indicating selections of various tokens, transactions, accounts, devices, users, or systems. The user interface can include a graphical user interface that can be presented at a display device. The display device can display at least one or more user interface presentations and can include an electronic display. An electronic display can include, for example, a liquid crystal display (LCD), a light-emitting diode (LED) display, an organic light-emitting diode (OLED) display, or the like. The display device can receive, for example, capacitive or resistive touch input. The mobile wallet system 355 can transmit one or more instructions, tokens, keys, or any combination thereof to, from, or with the computing system 102.

The user devices 104 can include data fields regarding information about an owner of a respective user devices 104. The data fields can include tokens corresponding to a user and a type for the tokenized asset. For example, a user device 104 can include a data field to indicate a user "John Doe" (identified using the universal unique identifier and multiple user identifiers) with tokenized assets correspond to a loan type. The data field can be visible to other user devices 104 within the demand network 305. For example, a user device 104 owned by "John Doe" can be visible to another user device 104 owned by "Joe Smith." The owners may not access the tokenized assets of other user devices 104.

The token processor 340 may identify one or more characteristics of tokens. For example, the token processor 340 may identify one or more characteristics of an individual token or a plurality of tokens satisfying criteria. The criteria by which tokens can be identified can include aspects of the token, fields, or components of the token, transform processes used to generate or modify the token, aspects of a metadata object linked with the token, owners of the token (e.g., a user identified by the universal unique identifier) or any combination thereof. For example, aspects of the token can include a hash of the token, or a value of an individual field of the token. The token processor 340 can generate a trait corresponding to one or more characteristics of a token or an object linked with the token. For example, the trait can include a scalar or vector quantity corresponding to one or more values of an aspect of the token. The trait can include a numeric value corresponding to an identifier of the token. In some arrangements, the token may be a fungible or an NFT.

The smart contract engine 345 (e.g., smart contract processing circuit, etc.) can generate and modify one or more smart contracts. In some examples, the smart contract engine 345 is part of the blockchain system such as the blockchain registry 106, 606, 806 (performed by the hardware such as processing circuits that implements the blockchain). For example, such blockchain system has a local storage for the states based on which a smart contract can be executed and logic to be persisted on a ledger distributed storage (e.g., a Merkle tree). The smart contract engine 345 can execute instructions to generate or modify a cryptographic container, to add or remove objects from a cryptographic container, and to execute various processors linked with or embedded with a smart contract. For example, the smart contract engine 345 can execute various processors of a smart contract in response to detecting input including or corresponding to a particular token at the smart contract. In another example, the smart contract engine 345 can include processors to read, write, generate or modify one or more objects contained within a container of the smart contract, one or more tokens input to the smart contract, or one or more processors of the smart contract. Furthermore, the smart contract engine 345 can obtain one or more tokens from the token processor 340, against one or more smart contracts. For example, the smart contract engine 345 can obtain one or more tokens from the token processor 340 to compare the one or more tokens against a particular one or more tokens requested by one of the one or more smart contracts. In some examples, the smart contract engine 345 can execute smart contracts for a digital asset of a particular user, identified using the universal unique identifier. A smart contract can be executed in connection with a digital asset in response to determining that the universal unique identifier of the user of the digital asset is the same as the universal unique identifier for the smart contract.

The user devices 104 within one or more demand networks 305 can connect to the third-party network of the third-party exchange system 304 using a secure connection. The secure connection can include a set of restrictions based on the set of protocols for the respective demand networks 305. For example, a network processor 325 can use a hypertext transfer protocol secure to establish a secure connection between a user device 104 within a demand network 305 to a third-party network. In another example, a network processor 325 can use a TLS/SSL library to establish a secure connection between a user device 104 within a demand network 305 to a third-party network. In another example, a network processor 325 can use a data encryption to establish a secure connection between a user device 104 within a demand network 305 to a third-party network. The set of restrictions can limit the information within the request to protect the client of the user devices 104 within the one or more demand networks 305 because the third-party network may access the public-private key par associated with the user devices 104. For example, one restriction in the set of restrictions can hide a name of a user device 104. In another example, one restriction in the set of restrictions can limit metadata associated with a demand network 305 to prevent a third-party network from identifying the demand network 305. The secure connection can ensure the assets corresponding to the user devices 104 are not subject to fraudulent activity.

The network 101 can transmit the request to the third-party exchange system 304. For example, a user device 104 can transmit a request to a main network (e.g., the computing system 102). The main network can broadcast the request to one or more demand networks 305. If the request is not accepted by the demand networks 305, the main network can transmit the request to a third-party network of a third-party exchange system 304. The third-party network can include a plurality of blockchains with a plurality of client systems. The client system can be the same as the user devices 104. For example, a client system can similar data fields to a user device 104. The request can include the type for the tokenized asset, one or more client systems in the third-party network, and a number of tokens corresponding to the type for the tokenized asset. For example, a request from the main network can have a loan type for the tokenized assets and 100 tokens to be transferred to a user device 104 within demand network 305.

Figure 4:
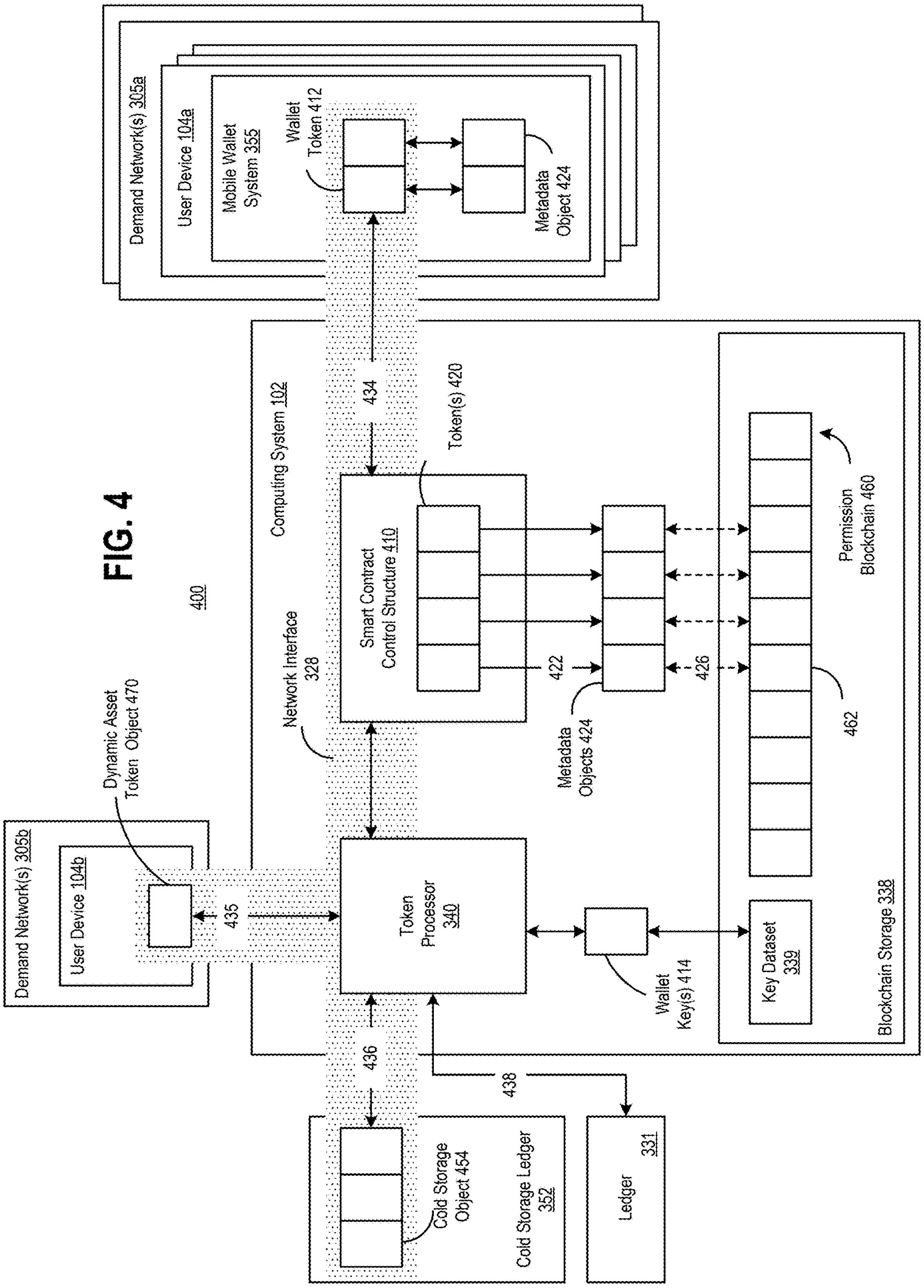
FIG. 4 is a block diagram illustrating an example digital asset architecture, according to various arrangements.

FIG. 4 is a block diagram illustrating an example digital asset architecture 400, according to various arrangements. The example digital asset architecture 400 can include at least the computing system 102, the user devices 104 (e.g., 104*a* and 104*b*), the ledger 331, the blockchain storage 338, the key dataset 339, the mobile wallet system 355, the network interface 328, the cold storage ledger 352, the cold storage object 454, a smart contract control structure 410, wallet tokens 412, wallet key(s) 414, digital assets (e.g., one or more tokens 420), one or more metadata links 422, one or more metadata objects 424, one or more blockchain links

426, internal key(s), a client link 434, a client link 435, a cold storage link 436, a ledger link 438, a token processor 340, a permission blockchain 460 with one or more blocks 426, and a dynamic asset token object 470.

The network processor 325 can receive the number of tokens 420 and one or more metadata objects 424 from one or more user devices 104 of the third-party network. For example, a third-party exchange system 304 can transmit a number of tokens 420 and a metadata object 424 to a main network. The main network can transfer the number of tokens 420 and the metadata object 424 to a demand network 305 corresponding to a request for the number of tokens. The metadata objects 424 within the user devices 104 of the third-party network can be the same as the metadata objects 424 in the user devices 104 of the demand networks 305. In some examples, metadata objects 424 can include information regarding the user of the user devices 104. The metadata object 424 can include a transaction ID, a timestamp, a type for the number of tokens, and user information. For example, a metadata object 424 can include the universal unique identifier of the user or a link, address, or identifier of the block on a blockchain of the distributed ledger database/blockchain 108 storing the universal unique identifier of the user. In some examples, the token 420 of a user each includes the universal unique identifier of the user or a link, address, or identifier of the block on a blockchain of the distributed ledger database/blockchain 108 storing the universal unique identifier of the user. In some examples, a metadata object 424 can include a funds type for the number of tokens.

The network interface 328 can communicate with one or more external systems and networks compatible with transferring a token. For example, the network interface 328 can include an API compatible with the third-party exchange system 304 and the user devices 104. For example, the network interface 328 can be configured to receive characteristics associated with particular tokens, types of tokens, or metadata objects linked with the particular tokens. In some arrangements, the network interface 328 can be configured to receive particular quantitative values corresponding to particular transfer of tokens between accounts and networks. The network interface 328 can thus provide the technical improvement of transmitting and receiving tokens from within the demand networks 305 and the third-party network. The network interface 328 can provide the technical improvement of providing an interface compatible with particular token transfer operations between networks (e.g., demand networks 305, third party networks, and so on).

The token processor 340 can determine an asset within the demand networks 305 by identifying an asset ID (which can also be a universal unique identifier as described) in the received tokens, from the third-party network, corresponding to the respective demand network 305. In some examples, the token processor 340 can determine an asset within the demand networks 305 by identifying a universal unique identifier of the user in the received tokens, from the third-party network, corresponding to the respective demand network 305. The token processor 340 can parse the received asset tokens to identify an asset ID. In some arrangements, the asset ID or the universal unique identifier of the user can be directly listed within the metadata object 424 associated with the received asset tokens. For example, a third-party network can transmit tokens 420 to a main network. The token processor 340 can parse the tokens 420 to identify an asset ID and/or the universal unique identifier of the user to create an associated between the received tokens 420 and a respective user devices 104 within a respective demand network 104. The computing system 102 can generate one or more blocks 426 within the blockchain storage 338. Each block in the one or more blocks correspond to the received token 220 to update the mobile wallet system 355 of the respective user devices 104. For example, in response to receiving tokens 420, a computing system 102 can generate one or more blocks 426.

In response to receiving the number of tokens, a token generator (e.g., token generator 560 described herein) can generate asset tokens. The token generator 560 can generate the asset tokens by tokenizing the number of tokens 420 to correspond to the plurality of asset tokens at the demand network. For example, the network interface 328 can transmit a received number of tokens to a token generator 560 and instruct the token generator 560 generate asset tokens based on a plurality of asset tokens in the demand networks 305 corresponding to a request. The received number of tokens can be transmitted to the cold storage ledger 352. The network processor 325 can store the metadata object 424 within the user devices 104*a* at the demand network 305*a* to update the mobile wallet system 355 based on the change. For example, a transaction ID field in a metadata object 424 can be extracted to update a user device 104*a* with the new transaction ID.

The smart contract engine 345 can apply the generated asset tokens to the one or more user devices 104 of the respective demand network 305. For example, a smart contract engine 345 can analyze and parse generated asset tokens to determine a respective user devices 104 within a respective demand network 305 for the storage of the generated asset tokens. The smart contract engine 345 can detect whether a particular token is compatible with a particular smart contract by detecting whether the particular token matches a particular token characteristic associated with the particular smart contract. For example, the smart contract engine 345 can detect that a token is compatible with a smart contract based on comparing a hash of the token with a hash included in the smart contract. To apply the generated asset tokens, the smart contracts within the smart contract storage 336 can store the generated asset tokens within the respective user devices 104.

The system processor 310 can generate a log of transactions to maintain a record of transactions within the main network. The log can include the number of tokens involved in the transaction and information within a metadata object. The system processor 310 can store the logs in the main network or in the system memory 330. The system memory 330 can maintain a log for all transactions within each of the demand networks 305. In some arrangements, the log can maintain a record of transactions between the main network and the third-party network 406. For example, a log can include a transaction between two demand networks 305*a* and 305*b*. The transaction can be for 50 tokens between "John Doe" and "Joe Smith." In another example, a log can include a transaction between two demand networks 305*a* and 305*b*. The transaction can be for 1 token between "John Doe" and "Joe Smith." In another example, a log can include a transaction between a demand network 305 and a third-party network. The transaction can be for 30 tokens between "John Doe" and "Joe Smith."

The user devices 104 can include an identity token. The identity token can indicate a form of identification for an owner of the demand network 305. The set of protocols for the demand network 305 can validate the form of identification to enable asset exchange within the demand network 305. The form of identification can include at least one of the universal unique identifier of the user, the Social Security Number (SSN), Passport, Identification Card, Birth Certificate, or a Driver's License, among others. In the examples in which the universal unique identifier is used as the identification, no other PII needs to be used, thus protecting the privacy of the user. The set of protocols can include identity proofing, biometric authentication, username/password, multi-factor authentical, or public key infrastructure among others.

The network processor 325 can use the identity token to determine a geolocation for the owners or users of the demand networks 305. A protocol in the set of protocols can define the geolocation for the demand network 305. For example, a protocol can establish a geolocation to be Maryland, therefore the owners of demand network 305 must be in Maryland to access the user devices 104. In another example, the geolocation can be a 100-mile radius between owners, therefore two owners can be transactions within a 100-mile radius of each other. The geolocation can be determined by using a Global Position System (GPS), Wi-Fi Positioning, Cellular Triangulation, or Bluetooth beacons among others.

The cold storage processor 350 can execute one or more actions with respect to generating (or creating), updating, protecting, and/or destroying cold storage objects in the cold storage ledger 352. In some arrangements, the cold storage processor 350 can communicate with the cold storage ledger 352 via an intermittent secure connection. In some arrangements, the process of establishing an intermittent secure connection can include disconnecting the computing system 102 from all networks (e.g., internet connections, wired connections, etc.) and connecting via a wired network connection or a wired or wireless local network connection (e.g., LAN, intra-network, etc.). The connection can be intermittent or discontinuous since the computing system 102 can perform many functions without having to access the cold storage ledger 352. In some arrangements, in response to initiating an exchange of a token stored on the computing system 102, an intermittent secure connection may be established. In various arrangements, user customer with a token account or the computing system 102 can add an attribute to each metadata object indicating whether a cold storage exchange must occur when exchanging the particular token. As used herein, "cold storage exchange" refers to the process of performing an exchange of a token using a cold storage object stored on the cold storage ledger 352.

In various arrangements, any data shared over the intermittent secure connection can be encrypted and/or secured (e.g., hashed, password protected, etc.) to prevent unauthorized parties from performing unauthorized actions on the intermittent secure connection. For example, a masking algorithm may be executed performing bitwise operations (e.g., NOT, AND, NAND, OR, XOR, Complement, left-shift (logical or arithmetic), right-shift (logical or arithmetic), rotate right, rotate left, etc.) on any data transferred over the intermittent secure connection. All communications over the intermittent secure connection can be encrypted with one or more secure network protocols (e.g., Secure Shell (SSL), Kerberos, IPSec, Secure Sockets Layer (SSL), Hypertext Transfer Protocol Secure (HTTPS), etc.) implemented utilizing a cryptographic function (e.g., symmetric encryption, asymmetric encryption, hashing, etc.). In some examples, the cryptographic function could be a homomorphic encryption function. In some examples, the cryptographic function could be any symmetric encryption function (e.g., Triple Data Encryption Standard (TDES), RC5, AES, Blowfish, CAST, etc.), and/or asymmetric encryption function (e.g., RSA, Efficient and Compact Subgroup Trace Representation (ECSTR or XTR), Digital Secure, Escrowed Encryption Standard (EES), etc.).

In general, a cold storage object can be a data structure that can be structured and formatted for storing data about tokens. For example, each token can include a linked metadata object and the metadata object may include protected and unprotected data. As used herein, "protected data" can include sensitive data such as, but not limited to, social security numbers (SSN), passport number, deoxyribonucleic acid (DNA), financial account number, other personal identifying information, biometric information, geolocation data indicating one or more locations of a person, photographs of people, criminal records, credit and/or payment card numbers, health data, and the like, whereas "unprotected data" can include data not considered sensitive data. In various arrangements, the computing system 102 can analyze, based on accessing the link of the token, the metadata object to determine if any protected data is present. In some arrangements, when protected data is present, the cold storage processor 350 may update the metadata object by extracting the protected data and storing the protected data in a newly generated cold storage object. For example, the computing system 102 can determine, via the link of the token, a first portion of metadata of the metadata object of the token associated with protected data of the token and a second portion of metadata of the metadata object of the token associated with unprotected data of the token, where the first portion of metadata does not contain any data from the second portion of metadata. In some examples, the cold storage processor 350 can remove or extract the first portion of metadata of the metadata object of the token based on accessing the metadata object via the link, and in turn generate a cold storage object with the protected data and the cold storage private key.

The system memory 330 can store data associated with the computing system 102. The system memory 330 can include one or more hardware memory devices to store binary data, digital data, or the like. The system memory 330 can include one or more electrical components, electronic components, programmable electronic components, reprogrammable electronic components, integrated circuits, semiconductor devices, flip flops, arithmetic units, or the like. The system memory 330 can include at least one of a non-volatile memory device, a solid-state memory device, a flash memory device, and a NAND memory device. The system memory 330 can include one or more addressable memory regions disposed on one or more physical memory arrays. A physical memory array can include a NAND gate array disposed on, for example, at least one of a particular semiconductor device, integrated circuit device, or printed circuit board device. The system memory 330 can include a ledger 331, a smart contract storage 336, and a blockchain storage 338 including a key dataset 339.

The ledger 331 can store the associations of tokens with token accounts (e.g., the association between a token account and the tokens owned or partially owned by the token account), while the blockchain storage 338 can store portions of tokens (e.g., smart contracts containing information pointing to the off-chain content and metadata) and keys of the token (e.g., stored in the key dataset 339). For example, the content and metadata of the token may be stored in an on-chain hash that can point to a storage location of the content and metadata. In some examples, the tokens and token accounts can be associated with the universal unique identifier of the user. In some examples, the ledger 331 is part of the blockchain system such as the blockchain registry 106, 606, 806, and so on (performed by the hardware such as processing circuits that implements the blockchain).

The smart contract storage 336 can store one or more smart contracts and corresponding addresses for particular smart contracts that indicate links with the corresponding smart contracts. The smart contract storage 336 can also store one or more control structures and their contained metadata objects and corresponding addresses for particular control structures that indicate links with the corresponding control structures.

The blockchain storage 338 can store one or more blockchains linked to one or more smart contracts, tokens, control structures, or metadata objects, by corresponding addresses for particular smart contracts, tokens, control structures, or metadata objects that indicate links with a particular blockchain.

The key dataset 339 can store cryptographic keys associated with the computing system 102 or any component thereof, the user device 104 or any component thereof, any metadata object, or any combination thereof. For example, the key dataset 339 can include public-private key pairs or private keys corresponding to particular accounts, tokens, smart contracts, devices, users, systems, or any combination thereof.

The mobile wallet system 355 can include one or more tokens and keys corresponding to various account and linked with the user devices 104. The mobile wallet system 355 implements a mobile wallet that represents an account of a user, private key ownership for the user, and user interface to be displayed by the user devices 104. The mobile wallet stores, on-chain, information regarding information related to a wallet address and assets owned by the wallet address, and can perform both read and write operations. For example, the mobile wallet system 355 can encapsulate one or more tokens linked with the user devices 104 within a secure container and can include an interface compatible with the token processor 340, the third-party exchange system 304, and the network interface 328. The mobile wallet system 355 can include wallet tokens 412. The wallet tokens 412 can each include a particular token and can correspond to particular metadata objects 424. A token of the wallet tokens 412 can be associated with a particular metadata object 424 and can be required to transmit output of the metadata object 424, transfer the metadata object 424 to another storage location, or any combination thereof, for example. Each of the wallet tokens 412 can indicate control of a particular metadata by a particular user linked with the mobile wallet system 355 via a cryptographic key or key pair, by for example including in each wallet token 412 the universal unique identifier or a link, address, or identifier of the block on a blockchain of the distributed ledger database/blockchain 108 storing the universal unique identifier.

The wallet key(s) 414 can include a key compatible with the wallet token 412. The wallet key(s) 414 can be stored in the key dataset 339 and received by a token authenticator processor via a wallet key transmission. The mobile wallet system 355 can execute a transaction or modify metadata of the wallet token 412 in response to detecting input including the wallet key 414. The wallet key(s) 414 can, for example, include a wallet public-private key pair, a wallet public key, or a wallet private key compatible with the mobile wallet system 355. The mobile wallet system 355 can permit access to the wallet token 412 based on the wallet key(s) 414, for example, compatible with the encapsulation layer and operable to decrypt the encryption corresponding to the encapsulation layer.

The smart contract control structure 410 can include one or more instructions to apply and transmit output of one or more of the tokens 420. The smart contract control structure 410 can correspond to an executable smart contract and can include a gateway component. The gateway component can include one or more instructions to restrict or prevent output of the tokens 420 in the absence or presence of one or more tokens compatible with the smart contract control structure 410. The smart contract control structure 410 can include an encapsulation layer that (shown as smart contract control structure 410), for example, maintains the tokens in an encrypted state. The smart contract control structure 410 can permit access to the tokens based on a private key, for example, compatible with the encapsulation layer and operable to decrypt the encryption corresponding to the encapsulation layer. The gateway component can be compatible with and interface with the network interface 328, and the encapsulation layer can be integrated with the smart contract control structure 410. The smart contract control structure 410 can be registered to the permission blockchain 460 by a block link with the permission blockchain 460.

The wallet token 412 can identify a token and can identify one or more characteristics linked with the token or corresponding to a request to transfer the token (e.g., asset, update). For example, the wallet token 412 can include an identifier of the token, a hash of the token, an identifier of a token account linked with the token, a token account linked with the request to transfer the token, the universal unique identifier of a user of the token, an identifier of a public-private key pair or any portion thereof, or any combination thereof. For example, the wallet token 412 can include an identification of a public-private key pair corresponding to a smart contract control structure of an owner of a token. In another example, the wallet token 412 can include an identification of a public-private key pair corresponding to a smart contract control structure of a buyer of a token. The client link 434 can transmit the wallet token 412 from the user devices 104 or the mobile wallet system 355 to the computing system 102 (in particular, the token processor 340) or the smart contract control structure 410.

The token processor 340 can execute one or more actions with respect to various cryptographic keys, tokens, containers, control structures, and smart contracts. For example, the token processor 340 can modify links between various containers, control structures, token, and smart contracts with various public-private key pairs. The token processor 340 can transfer public-private key pairs based on one or more operations of the cryptographic key processor 520, for example. The token processor 340 can generate and modify one or more metrics corresponding to various tokens, including the wallet tokens 412 and the tokens 420. The token processor 340 can generate or modify one or more containers, tokens accounts, or smart contracts, based on one or more operations of the smart contract control structure 410.

The token processor 340 can execute one or more actions with respect to generating the cold storage objects 454 and storing the cold storage objects 454 in the cold storage ledger 352. In some arrangements, the token processor 340 can establish an intermittent secure connection with the cold storage ledger 352 over the cold storage link 436. The token processor 340 can also execute one or more actions with respect to generating token accounts for the ledger 331, recording associations of tokens 420 with one or more token accounts of the ledger 331, and updating the ledger 331. In some arrangements, the token processor 340 can establish a connection with the ledger 331 over the ledger link 438.

The permission blockchain 460, within the blockchain storage 338, can include at least one blockchain including one or more of the blocks 426. The permission blockchain 460 can be linked with one or more of the metadata objects 424, the tokens 420, or the smart contract control structures 410. The permission blockchain 460 can include a blockchain operated and controlled at the computing system 102. The permission blockchain 460 can include a plurality of blockchains each corresponding to particular aspects of the links associated with the corresponding blockchains. The permission blockchain 460 can include the blocks 426, and the key dataset 339 can include the wallet key(s) 414, the internal keys, and/or other keys such as cold storage keys. The blocks 426 can include or store links to one or more objects associated with the permission blockchain 460. The keys stored in the key dataset 339 can include a reference, pointer, or the like, to or between a block among the blocks 426 and the keys associated with that particular block. For example, the internal key can include a reference, pointer, or the like, to or between a block among the blocks 426 and the internal key associated with that particular block.

In some arrangements, the token processor 340 can establish a secure connection with the user device 104*b* over the client link 435. The client link 435 can include a transmission path or communication path between the dynamic asset object 470 and the token processor 340 by the network interface 328. At least one network interface 328 or the token processor 340 can detect the dynamic token exchange object 470 via the client link 435.

Figure 5:
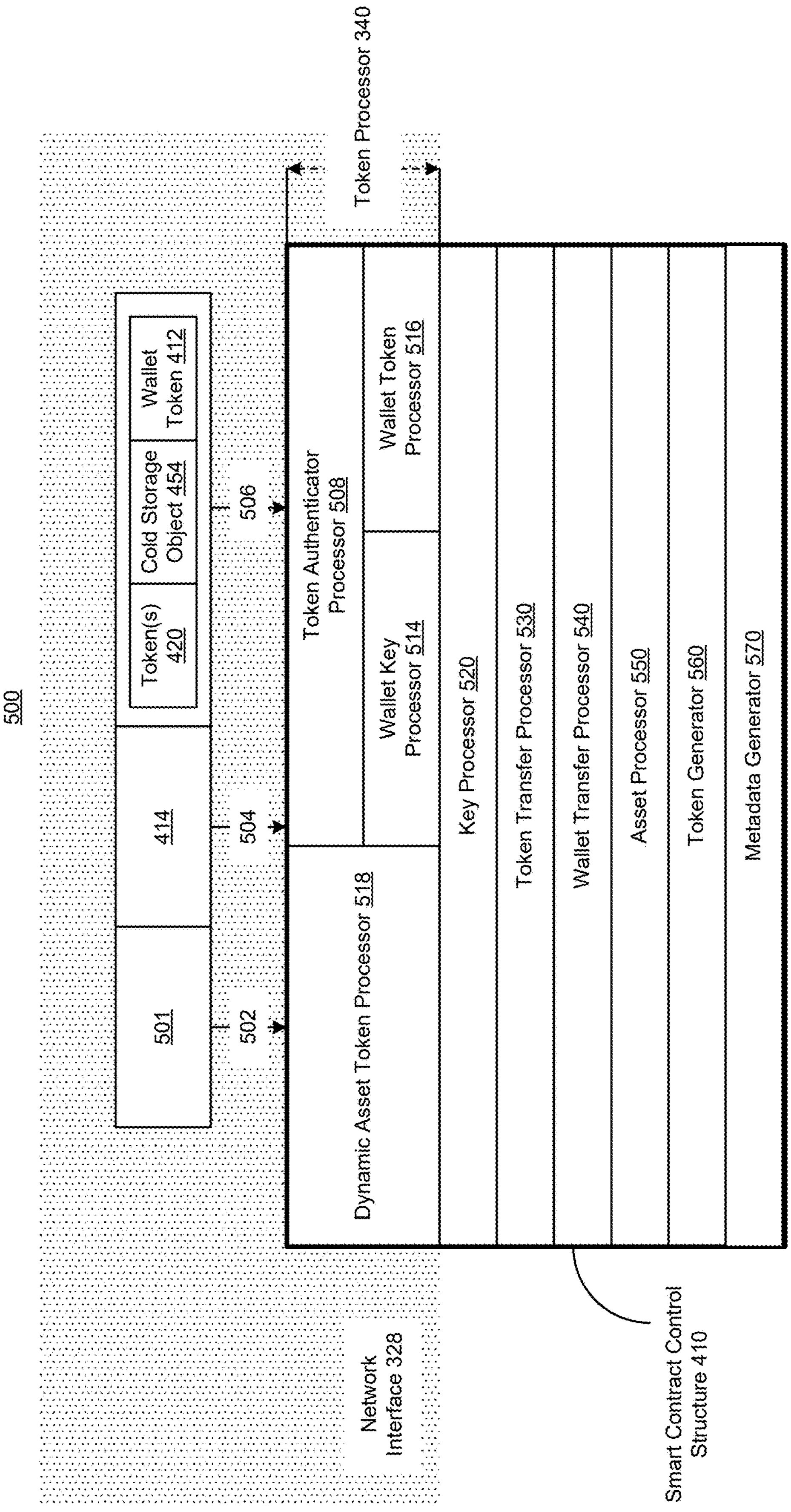
FIG. 5 is a block diagram illustrating an example digital asset architecture, according to various arrangements.

FIG. 5 is a block diagram illustrating an example digital asset architecture 500, according to various arrangements. The digital asset architecture 500 can include at least the network interface 328, a smart contract control structure 410, an internal key transmission 502, a wallet key transmission 504, and a token/object transmission 506. The smart contract control structure 410 includes a token processor 340 including a token authenticator processor 508, a wallet-internal token processor 514, a wallet-internal token processor 516, and a dynamic token exchange processor 518. The smart contract control structure 410 further includes a key processor 520, a token transfer processor 530, a wallet transfer processor 540, an asset processor 550, a token generator 560, and a metadata generator 570.

The internal key transmission 502 can be responsive to an action by the network interface 328 to transmit the internal key 501 to the smart contract control structure 410. The wallet key transmission 504 can be responsive to an action by the network interface 328 to transmit the wallet key 414 to the smart contract control structure 410. The token/object transmission 506 can be responsive to an action by the network interface 328 to transmit the wallet token 412, a restricted token, and/or the cold storage object 454 to the smart contract control structure 410. That is, the token/object transmission 506 can be one or more of the wallet tokens 412, the restricted token, and/or the cold storage object 454 received from one or more of the cold storage ledgers 352, the blockchain storage 338, and/or the mobile wallet system 355, via the network interface 328.

In some examples, the token processor 340 can query the ledger 331 for token account information (e.g., a universal unique identifier of the user) associated with the restricted token or the wallet token 412. For example, in response to the token processor 340 receiving the restricted token or the wallet token 412, the token authenticator processor 508 can determine if a token account corresponding to a universal unique identifier of a user has been generated for the received restricted token or the wallet token 412. In the above example, if a token account has been created, the token processor 340 may update the ledger 331 recording the token identifier (which can itself be a universal unique identifier as described herein) with a particular token account. In yet the above example, if a token account has not been created, the token processor 340 may provide the ledger 331 with information to generate a token account and record the token identifier with the newly generated token account.

The token processor 340 can communicate with, authenticate, and update various tokens and NFTs. The token processor 340 can include one or more interfaces corresponding to an API or a smart contract interface, for example. A smart contract interface can include one or more executable instructions integrated with a smart contract. The smart contract interface can execute instructions at the smart contract or triggered by the smart contract in response to detection of objects or conditions external to the smart contract. The token processor 340 can include at least a portion of a control structure of the smart contract.

The token authenticator processor 508 can detect the presence of a fungible token or non-fungible token and can determine whether the token is compatible with the smart contract control structure 410. The token authenticator processor 508 can be configured to be compatible with a particular fungible token or can be generated to be compatible with a particular fungible token. The token authenticator processor 508 can be configured to be compatible with a plurality of tokens having a particular characteristic or can be generated to be compatible with a plurality of tokens having a particular characteristic. A particular characteristic can include, for example, a particular identifier or portion of an identifier of a token. For example, the token authenticator processor 508 can be integrated with or store a hash based on a particular fungible token and a hash processor operable to generate a hash based on any fungible token. The token authenticator processor 508 can generate a hash in response to detecting the presence of the fungible token and can determine whether the fungible token is compatible with the smart contract control structure 410, in response generating the hash, by comparing the generated hash with the stored hash. The token authenticator processor 508 can include logic to detect a fungible token passed to it, by, for example, an activation instruction from the network interface 328.

In some arrangements, the token authenticator processor 508 can authenticate links of tokens based on successfully accessing, via the link, the metadata object of the tokens. The link can be the Token URI (a unique identifier of what the token "looks" like) or another link that can be provided to a token lookup table, a URL, a world-wide-web address, an internal network address, a HTTPS, an IPFS hash, and so on. In various arrangements, authenticating the link can include scanning and/or analyzing a token exchange, such as the third-party exchange system 304, to verify the received token is not stored on or being sold on the token exchange. In some arrangements, the token authenticator processor 508 can also collect on-chain data related to the token by accessing the previous public address (prior to transferring the token and encapsulating it within the smart contract control structure 410) and determine if the on-chain data (e.g., previous transaction history, owner, metadata, etc.) is consistent with the metadata of the received token.

The wallet-internal token processor 514 can detect the presence of the wallet token 412, the restricted token, and/or the cold storage object 454, and can extract one or more attributes, parameters, aspects, or values, or any combination thereof, from at least one of the wallet tokens 412, the restricted token, and/or the cold storage object 454. The wallet-internal token processor 514 can be configured to be compatible with the wallet token 412, the restricted token, the cold storage object 454, the network interface 328, the third-party exchange system 304, and/or the mobile wallet system 355. Thus, the wallet-internal token processor 514 can provide a technical improvement of direct communication between the computing system 102, the mobile wallet system 355, the third-party exchange system 304, the cold storage ledger 352, and the ledger 331. The wallet-internal token processor 514 can include a token profile or exchange profile corresponding to a particular token exchange system and compatible with a particular token.

The key processor 520 can generate, transfer, and modify various cryptographic keys. The key processor 520 can transfer one or more of the account key pairs (e.g., the wallet key(s) 414, the internal keys, etc.) to or from the smart contract control structure 410. For example, the key processor 520 can transfer a cryptographic key pair, a public key, a private key, a symmetric key, or any combination thereof, to or from the smart contract control structure 410 to indicate a change in control of a particular token account to the smart contract control structure 410. The key processor 520 can authenticate the smart contract control structure 410 to a particular token account in the ledger 331 based on a key of the smart contract control structure 410. For example, the key processor 520 can identify a token account associated with the internal keys (e.g., internal public-private key pair). For example, the key processor 520 can transmit a hash based on the internal keys to the mobile wallet system 355 associated with the token account, to authenticate the smart contract control structure 410 to the token account associated with the internal keys. The key processor 520 can generate a corresponding number of "internal keys" or "wallet keys" such as "public and private key pairs" that can control restrictions on output by the particular metadata object linked with the particular smart contract control structure 410 compatible with the particular token.

The token transfer processor 530 can transfer and modify various tokens. The token transfer processor 530 can include an API compatible with the permission blockchain 460. The token transfer processor 530 can selectively add or update blocks (e.g., the blocks 426, etc.) from the permission blockchain 460. The token transfer processor 530 can add or update blocks in accordance with restrictions or interfaces of the permission blockchain 460, and can add, modify, and delete blocks independently of the restrictions or interfaces of the permission blockchain 460 at any portion or index of the permission blockchain 460. The token transfer processor 530 can transfer the restricted token to or from the smart contract control structure 410.

The wallet transfer processor 540 can transfer and modify various tokens. The wallet transfer processor 540 can include an API compatible with the mobile wallet system 355. The wallet transfer processor 540 can selectively deposit, withdraw, or update tokens stored on the mobile wallet system 355. The wallet transfer processor 540 can deposit, withdraw, or update tokens in accordance with restrictions or interfaces of the mobile wallet system 355, and can deposit, withdraw, or update tokens independently of the restrictions or interfaces of the mobile wallet system 355 at any portion or index. The wallet transfer processor 540 can transfer the restricted token to or from the smart contract control structure 410. For example, the wallet transfer processor 540 can transfer a token in response to an indication by the key processor 520 that a withdrawal or deposit is requested by the mobile wallet system 355.

The asset processor 550 can transfer and modify various tokens corresponding an asset. The asset processor 550 can include an API compatible with the mobile wallet system 170, user devices 104, and the demand networks 305 to convert received tokens from the third-party network into asset tokens compatible with the computing system 102. The asset processor 550 can parse received token to extract an asset ID (e.g., a universal unique identifier) or the universal unique identifier of a user to identify a corresponding user device 104 for the received token. For example, an asset processor 550 can parse a received token to extract an asset ID or the universal unique identifier of the user that corresponds to user device **104*b* in demand network 305*b***.

The token generator 560 can generate one or more tokens in accordance with a metadata object. For example, the token generator 560 can generate multiple tokens based on a number of new metadata objects or tokens indicated by an obtained token. For example, the token generator 560 can generate one or more tokens each including a link or a reference to a parent (or primary) token (e.g., the restricted token, etc.) to identify a source token corresponding to the token minted by the token generator 560 (e.g., for a physical asset or a digital asset). For example, the token generator 560 can generate one or more tokens each including a link or a reference to a token from which the new tokens are minted. Thus, the token generator 560 can provide a technical improvement of validating a minting of a token based on a parameter embedded in the token. The parameter can include a hash of the parent token or the token from which the new tokens are minted, for example. Generating a token and minting a token can be used interchangeably.

The token generator 560 can also generate one or more tokens in accordance with a token or a control structure. For example, the token generator 560 can generate multiple tokens based on a number of new metadata objects or tokens indicated by an obtained token and linked with respective smart contract control structures. For example, the token generator 560 can generate one or more content tokens each linked with a particular smart contract control structure (e.g., the smart contract control structure 410, etc.) with which the respective token is compatible. The token generator 560 can modify and delete tokens linked with primary tokens or parent smart contract control structures, to update control of a partial transfer of metadata object control. For example, the token generator 560 can create a token controlling 25% of shares of a physical or digital asset and modify a token originally controlling 100% of the asset to link with a smart contract control structure controlling 75% of the asset. The token generator 560 can make the modification in accordance with an example for a change in control of 25% of the asset controlled by the original token holder.

The metadata generator 570 can generate one or more metadata objects in accordance with a received request with third-party data (e.g., various data sources). For example, the metadata generator 570 can generate multiple tokens based on a number of new metadata objects indicated by a withdrawal, deposit, or update from the mobile wallet system 355, and linked with respective smart contract control structures (e.g., the smart contract control structure 410, etc.). For example, the metadata generator 570 can generate one or more metadata objects each linked with a particular smart contract control structure (e.g., the smart contract control structure 410) by which the respective metadata object is controlled. The metadata generator 570 can modify and delete metadata objects linked with tokens or the smart contract control structures 210.

The metadata generator 570 can modify a quantitative value corresponding to a token. For example, a quantitative value corresponding to a token can indicate a value of fiat currency or MBC currency. The metadata generator 570 can modify the quantitative value of the token based on a determined value (such as from off-chain data) to generate a scaled quantitative value. For example, a token having a quantitative value of 10,000 denominated in United States Dollar (USD) can be scaled based on a determined value of 0.1 to 1,000. The token scaler can perform any linear or non-linear transformation on a quantitative value and is not limited to the example product transform discussed herein.

The metadata generator 570 can modify an owner (e.g., a user) of a token. In response to a transfer from a transferor user to a transferee user, the ownership of the token is updated from a first universal unique identifier of the transferor user to a second universal unique identifier of the transferee user. The metadata generator 570 can update the reference of owner of the token (e.g., in the metadata object 424, a blockchain evidencing ownership of the token) from a universal unique identifier of the transferor user or a link, address, or identifier of the block on a blockchain of the distributed ledger database/blockchain 108 storing the universal unique identifier of the transferor user to a universal unique identifier of the transferee user or a link, address, or identifier of the block on a blockchain of the distributed ledger database/blockchain 108 storing the universal unique identifier of the transferee user.

Some arrangements described herein relate to a DLT-based secondary marketplace that allows buying, selling, and trading of tokenized software such as ML models. With immutable auditability and ownership recordation, the ML model marketplace allows for atomic settlements of tokenized ML model commodities and related intellectual properties. The intellectual properties of the software and training datasets used to train the software (e.g., the ML model) can be documented by digital assets such as tokens (e.g., NFTs). In other words, for a given software, a plurality of tokens can be provided for the software itself, its training dataset, and intellectual property rights. This allows for various aspects of the software to be easily traded, even separately to different transferees. In some arrangements, the ML model marketplace includes a private-consortium-driven distributed network that is a marketplace for verified, digitally signed, and trained ML models. In some arrangements, the ML model marketplace includes a public distributed network that is a marketplace for verified, digitally signed, and trained ML models. In some arrangements, the ML models as tokenized assets that can be exchanged for monitory or other services on a blockchain. In some arrangements, the ML model marketplace provide a service to custody members assets, such as models, NFTs, etc.

Examples of ML models can include financial ML models, financial meta-ML models autonomous driving ML models, Large Language Models (LLMs), Vision Language Models (VLMs), and so on. An ML model can include codes, weights, parameters used for determining an output based on input. Given a same base model (e.g., a backbone model, a foundational model), different model users or members can train, update, or finetune the base model differently for different purposes, objectives, and available training/deployment datasets to produce different ML models or ML model versions. Each of the members, the ML model, the ML model version can be identified by a universal unique identifier as described herein. In other words, each of the model user, the member, the ML model, and the ML model version can be considered as a "user" for the purpose of determining the universal unique identifier. Such different variations, or "versions" of an ML model can be traded using the system 600 shown in FIG. 6.

Figure 6:
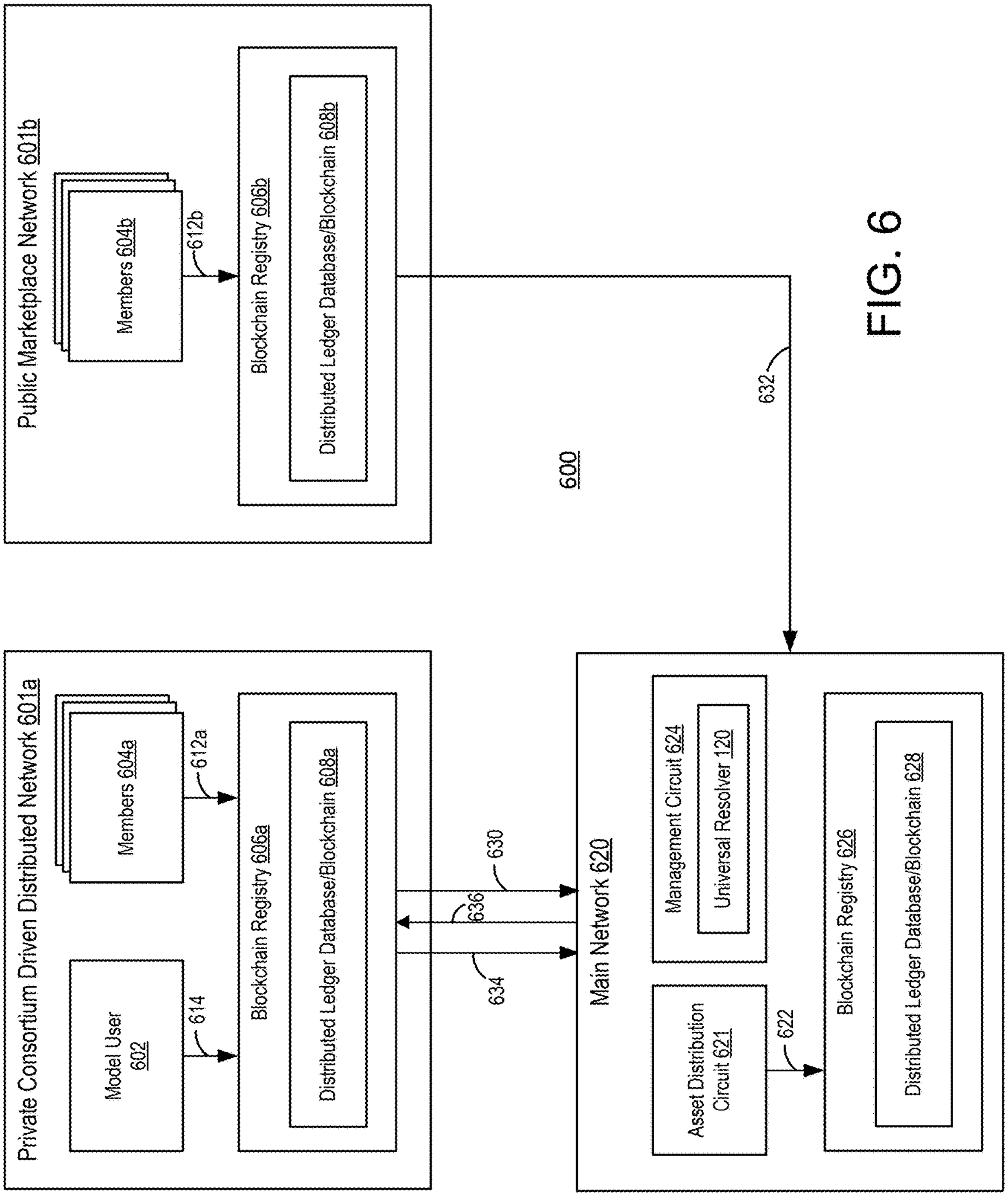
FIG. 6 is a block diagram illustrating an example system for providing a marketplace that allows buying, selling, and trading tokenized ML models, according to various arrangements.

FIG. 6 is a block diagram illustrating an example system 600 for providing a marketplace that allows buying, selling, and trading tokenized ML models, according to various arrangements. The system 600 includes various networks 601*a* and 601*b* and a main network 620. The networks 601*a* and 601*b* can be collectively referred to as networks 601 and individually referred to as a network 601. In the system 600, the main network 620 can provide immutable auditability and ownership recordation of ML models and versions thereof, atomic settlements of tokenized ML model commodities and related intellectual properties, and so on.

The main network 620 can be a private-consortium-driven distributed network or a public distributed network that is a marketplace for verified, digitally signed, and trained ML models and versions thereof as valued commodities. In some examples, the network 601*a* is a private-consortium-driven distributed network in which membership of the members 604*a* and the model user 602 is privately controlled. In some examples, the network 601*b* is a public marketplace network in which membership is public upon registration. The main network 620 bridges the gap between the networks 601*a* and 601*b* to allow assets to be bought, sold, and traded across the networks 601*a* and 601*b*. Each of the networks 601*a*, 601*b*, or 620 can be provided by or for a different provider institution, platform, application, enterprise, etc. For example, each of the networks 601*a*, 601*b*, or 620 can be provided by or for a financial institution digital platform, exchange platform, P2P trading platform, digital asset trading, custody, and management platform, and so on.

The network 601*a* includes members 604*a* that can use, program, train (e.g., update), provide, or request a ML model or a version of a ML model. The model user 602 is one of the members 604*a*. The network 601*b* includes members 604*b* that can use, program, train (e.g., update), provide, or request a ML model or a version of a ML model. The members 604*a* and 604*b* can be collectively referred to as members 604 and individually referred to as a member 604. Each member 604 can be a mobile computing device, desktop computer, smartphone, tablet, smart watch, smart sensor, or any other device configured to facilitate receiving, displaying, and interacting with content (e.g., web pages, mobile applications, such as decentralized application (dApp), etc.). The member 604 may include processing capabilities for updating an ML model based on a training set. In some arrangements, each member 604 (e.g., a user device 104) can have a digital wallet address (e.g., maintained by the mobile wallet system 355) for exchanging (e.g., receiving or sending) fungible or non-fungible values (e.g., cryptocurrency, digital currency, stocks, bonds, loan, deed, etc.) corresponding to versions of an ML model.

A same base model may be trained, updated, or finetuned (collectively, "updated") by multiple members 604, resulting in different versions of the ML model across the different networks 601. With respect to training a same base model, different members 604 can use different training dataset (e.g., different text datasets, different image or video datasets, different input datasets, and so on) to update the base model for the respective purposes and functions of the different members 604. In addition, different members 604 can set different training goals (e.g., loss or gain functions, different convergence threshold, and so on) and different training methods (e.g., supervised, semi-supervised, unsupervised, etc.) to update the base model for the respective purposes and functions of the different members 604. A base ML model can be an updated version of another ML model.

The network 601*a* includes a blockchain registry 606*a*. The network 601*b* includes a blockchain registry 606*a*. The blockchain registries 606*a* and 606*b* can be collectively referred to as blockchain registries 606 and individually referred to as a blockchain registry 606. A blockchain registry 606 is a computing system (e.g., a server) that manages a distributed ledger database/blockchain 608*a* (e.g., one or more blockchains) for storing information related to a version of an ML model. While FIG. 6 may be described with respect to members 604 updating or finetuning a same base model resulting in different versions of the ML models, the same mechanisms described herein can be likewise implemented for different ML models (having different base models).

Within a network 601, the members 604 and the blockchain registry 606 can communicate with each other over one or more communication networks such as those described herein. The blockchain registries 606 can communicate with the main network 620 over one or more communication networks such as those described herein.

At 612*a*, each member 604*a* can provide (e.g., send over a communication network) information of a version of the ML model including a link (e.g., a URI, URL, URN, etc.) to the code of the version of the ML model, identification of the intellectual properties of the version of the ML model, a link to the training dataset to the blockchain registry 606*a* for registration, and a timestamp. At 612*b*, each member 604*b* can provide (e.g., send over a communication network) information of a version of the ML model including a link to the code of the version of the ML model, identification of the intellectual properties of the version of the ML model, a link to the training dataset to the blockchain registry 606*b* for registration, and a timestamp. The timestamp can indicate a time at which each member 604 sends the information of a version of the ML model to the blockchain registry 606 in its network, a time at which the link to the code, the identification of the intellectual properties, and the link to the training dataset is created by the member 604, and so on. In some examples, one timestamp is provided for each version of the ML model (e.g., one timestamp for all different types of information of the version of the ML model). In some examples, a timestamp is provided for each type of information of the version of the ML model (e.g., a first timestamp is provided for the link to the code, a second timestamp is provided for the identification of intellectual properties, a third timestamp is provided for the link to the training dataset).

The blockchain registry 606 can tokenize a version of an ML model posted by a member 604 to the network 601, the intellectual properties of the version of the ML model, and training dataset used to generate the version of the ML model separately for improvement granularity in management thereof. In some examples, the blockchain registry 606 can tokenize the version of the ML model by determining a first token (e.g., an NFT) for the version of the ML model, at least one second token (NFT) each for an intellectual property of the version of the ML model, and a third token for training data used to update an ML model to arrive at the version of the ML model.

The first token can include the link (e.g., a URI, URL, URN, etc.) to the code (e.g., parameter and weights) of the version of the ML model, which can be stored in another suitable storage system (e.g., cloud storage, database, etc.). In some examples, the blockchain registry 606 can digitally sign a content of the first token using its private key and include the digital signature in the first token. The content of the first token can include the link to the code and at least one of the timestamp for this type of information received from the member 604 or a timestamp indicating a time at which the first token is generated by the blockchain registry 606.

Each second token can include a description, name, or identifier for an intellectual property right of the version of the ML model. In some examples, the blockchain registry 606 can digitally sign a content of the second token using its private key and include the digital signature in the second token. The content of the second token can include the description, name, or identifier for an intellectual property right and at least one of the timestamp for this type of information received from the member 604 or a timestamp indicating a time at which the second token is generated by the blockchain registry 606.

The third token can include the link (e.g., a URI, URL, URN, etc.) to the training dataset for the version of the ML model, which can be stored in another suitable storage system (e.g., cloud storage, database, etc.). In some examples, the blockchain registry 606 can digitally sign a content of the third token using its private key and include the digital signature in the third token. The content of the third token can include the link to the training dataset and at least one of the timestamp for this type of information received from the member 604 or a timestamp indicating a time at which the third token is generated by the blockchain registry 606. The timestamps for a given type of information received from the member 604 for the first, second, and third token can be the same or can be different for each type of information, as described herein.

In some arrangements, the content of each of the first token, the second token, or the third token includes a link or identifier (e.g., a token ID or a DID specific to the network 601) to the other ones of the first token, the second token, or the third token. This allows the tokens for the same version of the ML model to be mapped to one another. In some arrangements, the content of each of the first token, the second token, or the third token includes one or more of a creator address (e.g., the wallet address of the member 604 or the wallet address of the blockchain registry 606) or a current holder address (which is set to the wallet address of the member 604 before any transfer).

In some situations, training and updating of an ML model can be continuous, and versions of an ML model may not be discretely defined based on meeting a specific well-defined training goal, where such training goals may also shift over time. Thus, by including timestamps in the tokens for the ML model versions as described herein, versions of the ML model can be automatically defined within a network 601 and used among the networks 601 and the 620 for trading the ML model. This mechanism effectively addresses the technical issues that arise from the lack of definitive versions of ML models when ML model training is continuous, in addition to the improved security as the timestamp is encapsulated within the signature of the blockchain registry 606. The digital signature encapsulates and protects all information needed to identify the asset to be transferred or traded, including the underlying asset (e.g., the link to the code, the intellectual properties associated with code, the link to the training dataset, links to or identifiers of other tokens, creator address, current holder address, and the timestamp (s)).

In some arrangements, the blockchain registry 606 is configured to generate and manage the distributed ledger database/blockchain 608 (e.g., one or more blockchains, one or more distributed ledgers, one or more DLT networks, and so on). To generate the distributed ledger database/blockchain 608, the blockchain registry 606 can execute a series of instructions for initializing the distributed ledger database/blockchain 608. This can include allocating network resources (e.g., memory, processing power) and setting up network parameters like consensus protocols and cryptographic keys. Additional nodes on the network (not shown) are then instantiated, each running an instance of the distributed ledger database/blockchain 608 and maintaining its state. In case that information stored in a previously allocated and filled block of the blockchain is modified, updated, or added (e.g., a token is determined as described herein), a new block of the blockchain is allocated to include the modified, updated, or added information, as well as any information that is not modified or updated.

In some arrangements, the blockchain registry 606 stores the first, second, and third tokens in connection with a same version of the ML model in a same block. In some examples, the blockchain registry 606 stores the first tokens of different versions of a same ML model posted within the network 601 in a first block, stores the second tokens of different versions of a same ML model posted within the network 601 in a second block, and stores the third tokens of different versions of a same ML model posted within the network 601 in a third block. The first, second, and third blocks can be blocks on the same or different blockchains of the distributed ledger database/blockchain 608. In some examples, the blockchain registry 606 stores the first tokens of different versions of a same ML model posted within the network 601 in a first blockchain, stores the second tokens of different versions of a same ML model posted within the network 601 in a second blockchain, and stores the third tokens of different versions of a same ML model posted within the network 601 in a third blockchain. The distributed ledger database/blockchain 608 also stores transaction or trade metadata or information, such as price, duration of use or license, limitations on license such as the total number for each of the first, second, or third token. For example, a token and its associated transaction or trade metadata or information can be stored in the same block of the distributed ledger database/blockchain 608.

The main network 620 can generate distribute digital assets corresponding to versions of ML models and manage membership of the members 604. The main network 620 includes at least one processing circuit (such as the processing circuit 122) to implement components and functions of the main network 620. For example, such processing circuit can be used to implemented one or more of the circuits 621, 624, and 626. The members 604 and the blockchain registries 606 each includes a processing circuit such as the processing circuit 122. The main network 620 further includes a network interface circuit such as the network interface circuit 128 configured for and structured to establish a connection and communicate with the network 601*a* (e.g., the blockchain registry 606*a*) and the network 601*b* (e.g., the blockchain registry 606*b*). The members 604 and the blockchain registries 606 each includes a network interface such as the processing circuit 128.

The management circuit 624 is configured to manage the members 604 across the different networks 601. In some examples, the management circuit 624 includes or corresponds to the universal resolver 120 for determining a universal unique identifier for each user (customer who operates multiple members 604 across the different networks 601). A computing device (such as the computing system 102) in each network 601 can assign a user identifier (e.g., a user DID) to each user operating a member 604 (e.g., a user device 104). A blockchain registry 106*a* in the network 601 (e.g., the network 101) can provide the provider institution identifier (e.g., provider DID) of the network 601 and the user identifier to the management circuit 624 (e.g., the universal resolver 120) for determining the universal unique identifier of the user (e.g., the members 604) in the manner described herein.

The management circuit 624 is configured to manage the versions of ML models across the different networks 601. In some examples, the management circuit 624 includes or corresponds to the universal resolver 120 for determining a universal unique identifier for each version of a model generated by the same customer and posted as multiple members 604 across the different networks 601. In this case, the version of an ML model is treated as a user for the purpose of generating the universal unique identifier in FIGS. 1 and 2. A computing device (such as the computing system 102) in each network 601 can assign a user identifier (e.g., a user DID) to each version of an ML model posted by a member 604 (e.g., a user device 104). A blockchain registry 106 in each network 601 (e.g., the network 101) having the same version of the ML model can provide the provider institution identifier (e.g., provider DID) of the network 601 and the user identifier for the version of the ML model to the management circuit 624 (e.g., the universal resolver 120) for determining the universal unique identifier of the user, which is a version of the ML model. Given that the same member 604 may have member accounts at different networks 601, this allows the same version of the ML model to be identified with the universal unique identifier across the different networks 601.

The management circuit 624 is configured to manage the tokens of the same version of ML models across the different networks 601. In some examples, the management circuit 624 includes or corresponds to the universal resolver 120 for determining a universal unique identifier for each digital asset or token (e.g., the first token, the second token, and the third token) corresponding to a same version of a model generated by the same customer and posted as multiple members 604 across the different networks 601. In this case, each of the first, second, and third tokens is treated as a user for the purpose of generating the universal unique identifier in FIGS. 1 and 2. A computing device (such as the computing system 102) in each network 601 can assign a user identifier (e.g., a user DID) to each token of a version of an ML model posted by a member 604 (e.g., a user device 104). A blockchain registry 106 in each network 601 (e.g., the network 101) having the same version of the ML model can provide the provider institution identifier (e.g., provider DID) of the network 601 and the user identifiers for the tokens of the version of the ML model to the management circuit 624 (e.g., the universal resolver 120) for determining the universal unique identifier of the user, which is token of a version of the ML model. Given that the same member 604 may have accounts at different networks 601 that generate different tokens for the same type of information, this allows the same tokens of the same version of the ML model to be identified with the universal unique identifiers across the different networks 601.

In some examples, the management circuit 624 can identify the same version of the ML model received from the different networks 601 (e.g., the different blockchain registries 606) via the link to the code of the version of the ML model, which is the same across different networks 601. In some examples, the management circuit 624 can identify the same version of the ML model received from the different networks 601 (e.g., the different blockchain registries 606) via the link to the code of the version of the ML model and the timestamp indicating a time at which the link to the code, the identification of the intellectual properties, and the link to the training dataset is created by the member 604. In some examples, the management circuit 624 can identify the tokens of the same version of the ML model received from the different networks 601 (e.g., the different blockchain registries 606) via the link to the code of the version of the ML model and the timestamp indicating a time at which the link to the code, the identification of the intellectual properties, and the link to the training dataset is created by the member 604.

In some arrangements, in response to determining one or more of the universal unique identifier for the member 604 providing the ML model, the universal unique identifier for the version of the ML model, or the universal unique identifier for each token, the management circuit 624 provides (e.g., sends via a communication network) to the blockchain registries 606 of the networks 601 the one or more of the universal unique identifier for the member 604 providing the ML model, the universal unique identifier for the version of the ML model, or the universal unique identifier for each token to update the respective distributed ledger databases/blockchains 608 with such information.

The blockchain registry 626 is configured to generate and manage the distributed ledger database/blockchain 628 (e.g., one or more blockchains, one or more distributed ledgers, one or more DLT networks, and so on). To generate the distributed ledger database/blockchain 628, the blockchain registry 626 can execute a series of instructions for initializing the distributed ledger database/blockchain 628. This can include allocating network resources (e.g., memory, processing power) and setting up network parameters like consensus protocols and cryptographic keys. Additional nodes on the network (not shown) are then instantiated, each running an instance of the distributed ledger database/blockchain 608 and maintaining its state. In case that information stored in a previously allocated and filled block of the blockchain is modified, updated, or added (e.g., tokens are received as described herein), a new block of the blockchain is allocated to include the modified, updated, or added information, as well as any information that is not modified or updated.

The blockchain registry 626 can register all tokens (e.g., the first token, the second token, and the third token) associated with the version of an ML model. For a given version of the ML model, the blockchain registry 626 can allocate a block in the distributed ledger database/blockchain 628 (e.g., a blockchain) to store mirror versions of the first token, the second token, and the third token of the version of an ML model from each network 601 that hosts that version of the ML model, as identified by one or more of the same universal unique identifier for the member 604 providing the ML model, the same universal unique identifier for the version of the ML model, or the same universal unique identifier for each stored token. In other words, the tokens reside on both the distributed ledger database/blockchain 608 and the distributed ledger database/blockchain 628. The block in the distributed ledger database/blockchain 628 also stores one or more of the universal unique identifier for the member 604 providing the ML model, the universal unique identifier for the version of the ML model, or the universal unique identifier for each token, as well as any corresponding user identifiers of the member 604, user identifiers of the version, and user identifiers each token across the different networks 601 to establish correspondence between the universal unique identifier and the network-specific user identifiers. For example, the block can include a mapping table that maps the universal unique identifiers for the member 604, its versions of the ML models, and their tokens to network-specific user identifiers for the member 604, its versions of the ML models, and their tokens. In some examples, the blockchain registry 626 stores, instead of the tokens themselves, links, addresses, or identifiers to those tokens on the distributed ledger database/blockchains 608 or links, addresses, or identifiers of the blocks of the distributed ledger database/blockchains 608 on which the tokens are stored.

The tokens and the links thereof are provided by the blockchain registry 606*a* to the main network 620 at 630. The tokens and the links thereof are provided by the blockchain registry 606*b* to the main network 620 at 632. Accordingly, the distribute database ledger 628 maps the version of the ML model as identified using one or more of a universal unique identifier of the member 604, a universal unique identifier of the version of the ML model, or a universal unique identifier of each token to the different postings of the same version or tokens of the ML model across different networks 601. The distributed ledger database/blockchain 608 may store the user identifiers specific to their own network 601 for the member 604, versions of ML models, and tokens of intellectual property rights as well as their corresponding universal unique identifiers.

In some arrangements, in response to receiving one or more of the first, second, or third token from the blockchain registry 606*a* at 630, the main network 620 (e.g., the management circuit 624) verifies the signature of the blockchain registry 606*a* on the first token, second token, or third token using a public key of the blockchain registry 606*a*. The private key used by the blockchain registry 606*a* to sign the content of the first, second, or third tokens and the public key of the blockchain registry 606*a* form a public-private key pair. In some arrangements, in response to receiving one or more of the first, second, or third token from the blockchain registry 606*b* at 632, the main network 620 (e.g., the management circuit 624) verifies the signature of the blockchain registry 606*b* on the first token, second token, or third token using a public key of the blockchain registry 606*b*. The private key used by the blockchain registry 606*b* to sign the content of the first, second, or third tokens and the public key of the blockchain registry 606*b* form a public-private key pair. In response to verifying the signatures on the first token, the second token, and the third token, the universal resolver 120 can determine the universal unique identifiers for the first token, the second token, and the third token and the management circuit 624 registers the first token, the second token, and the third token.

The asset distribution circuit 621 can identify, in response to a request for a version of an ML model, all tokens (e.g., the first token, the second token, and the third token) associated with the version of an ML model, including those on the distributed ledger database/blockchains 608 of different networks 601. The model user 602 can provide (e.g., send via a communication network) a request to the blockchain registry 606*a* for a version of the ML model at 614. The blockchain registry 606*a* relays the request to the main network 620 (e.g., the asset distribution circuit 621) at 634.

In some examples, the request from the model user 602 to the blockchain registry 606*a* includes one or more of the network-specific user identifier of a member 604 (in either network 601*a* or 601*b*), user identifier of the version of the ML model, or user identifier of a token. The request forwarded by the blockchain registry 606*a* to the main network 620 (e.g., to the asset distribution circuit 621) also includes the one or more network-specific user identifiers. The asset distribution circuit 621 can query the distributed ledger database/blockchain 628 using the network-specific user identifier(s) specific to the network 601*a* to determine the corresponding the universal unique identifier(s).

In some examples in which one or more of the universal unique identifier of the member 604, the universal unique identifier of the version of the ML model, or the universal unique identifier of each token is provided by the main network 620 back to the blockchain registry 606*a* to be stored in the distributed ledger database/blockchain 608*a*, the request from the model user 602 to the blockchain registry 606*a* includes one or more of the network-specific user identifier of a member 604, user identifier of the version of the ML model, or user identifier of a token. blockchain registry 606*a* can query the distributed ledger database/blockchain 608*a* using the network-specific user identifier(s) specific to the network 601*a* to determine the corresponding the universal unique identifier(s). The request forwarded by the blockchain registry 606*a* to the main network 620 (e.g., to the asset distribution circuit 621) includes the universal unique identifier of the member 604, the universal unique identifier of the version of the ML model, or the universal unique identifier of a token.

In some arrangements, at 622, the asset distribution circuit 621 can query the distributed ledger database/blockchain 628 using the universal unique identifier of a member 604 to identify the universal unique identifiers and/or network-specific user identifiers of a version of an ML model produced by the member 604 and the tokens associated with the version of the ML model across the different networks 601. In some embodiments, the asset distribution circuit 621 can query the distributed ledger database/blockchain 628 using the universal unique identifier of a version of the ML model to identify the universal unique identifiers and/or network-specific user identifiers of the tokens associated with the version of the ML model across the different networks 601. In some embodiments, the asset distribution circuit 621 can query the distributed ledger database/blockchain 628 using the universal unique identifier of a token (e.g., for a specific intellectual property right) of a version of the ML model to identify the network-specific user identifiers of this token and/or other tokens associated with the same version of the ML model across the different network 601. Different networks 601 may offer different intellectual property rights (e.g., different second tokens), and different networks 601 may offer the same token for different prices. This allows the asset distribution circuit 621 to provide to the model user 602 with information for the different tokens in the different networks 601.

For example, the asset distribution circuit 621 can look up relevant metadata (e.g., price, duration of use or license, limitations on license such as the total number of users, and so on) of each token revealed in the query by sending a request over a communication network to the blockchain registry 606*b* using the universal unique identifier of the token or the user identifier of the token specific to the network 601*b*. The blockchain registry 606*b* can perform a lookup in the distributed ledger database/blockchain 608*b* using the universal unique identifier of the token or the user identifier of the token specific to the network 601*b* and return the same to the asset distribution circuit 621 over a communication network. For a given token, the asset distribution circuit 621 can return the relevant information and the user identifier of the token specific to the network 601*b* back to the blockchain registry 606*a* at 636, which relays the information back to the model user 602 as a response to its request at 614.

A model development, operations, and governance system can be audit the information stored in the distributed ledger database/blockchain 628 for compliance.

Figure 7:
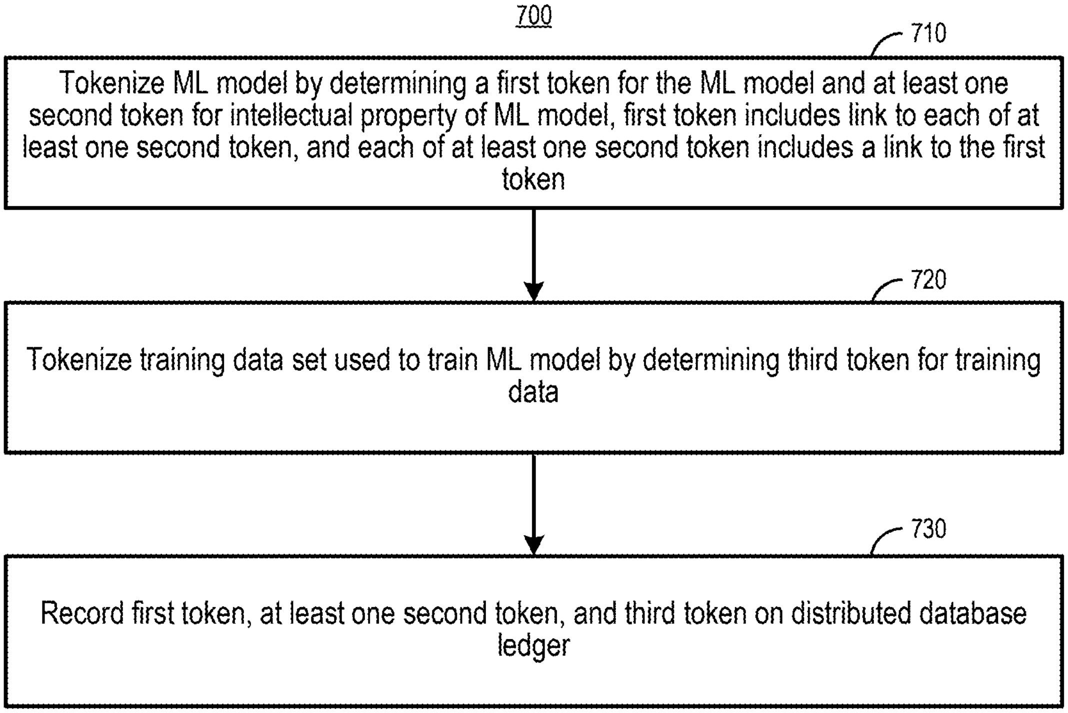
FIG. 7 is a flowchart diagram illustrating an example method for providing a marketplace of digital assets from different networks, according to various arrangements.

FIG. 7 is a flowchart diagram illustrating an example method 700 for providing a marketplace (e.g., the main network 620) of digital assets from different networks 601, according to various arrangements. The method 700 can be performed in the system 600, for example, by the main network 620 (e.g., by one or more processors). The flow illustrated in FIG. 6 is an example implementation of the method 700.

At 710, a blockchain registry 606 in each network 601 tokenizes a ML model by determining a first token for the ML model and at least one second token for intellectual property rights of the ML model. The first token includes a link to each of the at least one second token. Each of the at least one second token includes a link to the first token. In some examples, tokenizing the ML model comprises tokenizing a version of the ML model. The first token is for the version of the ML model. In some examples, the intellectual property of the ML includes at least one of patent rights, copyright, or trademark rights. In some examples, the at least one second token includes a plurality of second tokens. The intellectual property comprises a plurality of types of the intellectual property rights, each of the plurality of second tokens corresponds to a respective one of the plurality of types of the intellectual property. In some examples, the at least one second token includes a plurality of second tokens, each of the plurality of second tokens contains a link to each of other ones of the plurality of second tokens.

At 720, the blockchain registry 606 in each network 601 tokenizes training dataset used to train the ML model by determining a third token for the training data. At 730, the first token, the at least one second token, and the third token on a distributed ledger database/blockchain. For example, each blockchain registry 606 records the first token, the at least one second token, and the third token on a respective distributed ledger database/blockchain 608. The blockchain registry 626 records the first token, the at least one second token, and the third token on the distributed ledger database/blockchain 628.

In some examples, recording the first token, the at least one second token, and the third token on a distributed ledger database/blockchain 608 or 628 includes storing the first token in a first block of a blockchain of the distributed ledger database/blockchain, storing the at least one second token on at least one second block of the blockchain, and storing the third token in a third block of the blockchain. In some examples, recording the first token, the at least one second token, and the third token on a distributed ledger database/blockchain comprises storing the first token, the at least one second token, and the third token in a same block of a blockchain of the distributed ledger database/blockchain 608 or 628.

Some arrangements described herein relate to a DLT network that provides infrastructure or governance model exists for enterprise-wide of versioning and sharing of AI models by offering a distributed infrastructure and clear governance rule sets to ensure a high level of assurance with authentication, digital certification, digital signature, and context menu.

The arrangements described herein relate to using a DLT network to persist AI models (e.g., champion and production models) in a distributed DLT nodes, where AI models and versions thereof are verified, versioned, and tokenized so that the AI models can be easily embedded, shared in a distributed fashion. The DLT network can ensure that each participant on the DLT network shares and runs the same version of the model, and model tunning and learning are propagated to all DLT nodes and permissioned participants that need to know. The DLT network can facilitate with sharing the data, allowing the sharing of data between countries that allow the sharing of data and disallowing the sharing of data between countries where sharing of data is prohibited by one of those countries.

In some examples, the DLT network and the AI technology are powered by edge commuting where an AI model that runs on a customer edge device can learn based on operations or data on the customer edge device. The AI and DLT along the edge computation supports Artificial Intelligence for IT Operations (AI OPS) life cycle and solves for data sharing issues and regulations. The updated version of the AI model and a pointer to the updated version of the AI model can be stored in the DLT network. In response to determining a corrupted version of an AI model, an encrypted and champion version with a corresponding value that is stored on a DLT node (in a case of repudiation) can be identified and used instead of the corrupted version. The blockchain registry stores the final or production version of an approved AI models. In some situations, the AI OPS life cycle can include continuous training and updating of ML models by various different members 604 and model users 602, 804.

Figure 8:
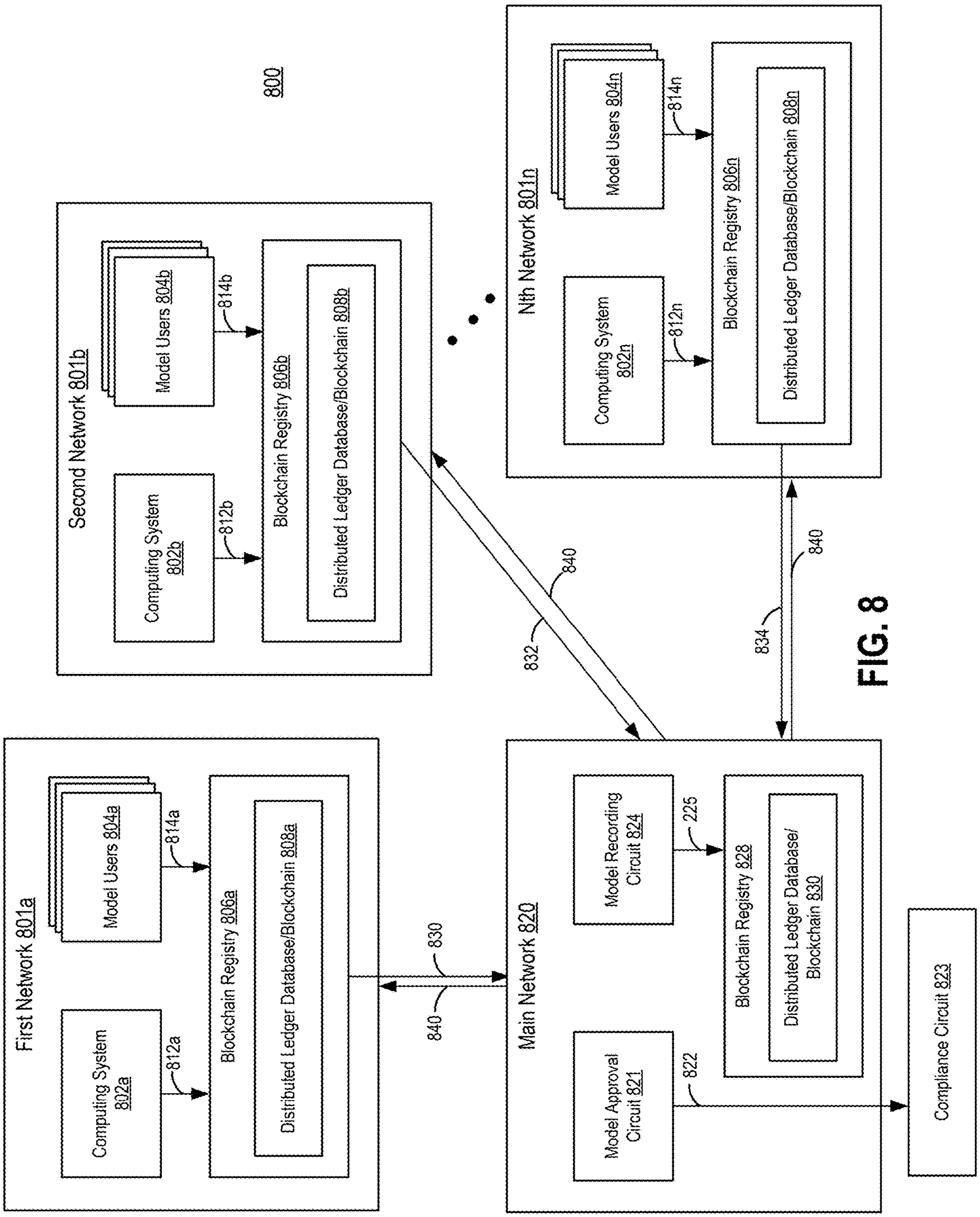
FIG. 8 is a block diagram illustrating an example system for managing versions of ML models, according to various arrangements.

FIG. 8 is a block diagram illustrating an example system 800 for managing versions of ML models, according to various arrangements. The system 800 includes various networks 801*a*, 801*b*, . . . , 801*n* and a main network 820. The networks 801*a*, 801*b*, . . . , 801*n* can be collectively referred to as networks 801 and individually referred to as a network 801. In the system 800, the main network 820 records and reconciles different versions of a ML model from different networks 801.

Each network 801 can be provided by or for a different region, country, provider institution, platform, application, enterprise, etc. For example, each network 801 can be provided by or for a country, a region, financial institution digital platform, exchange platform, P2P trading platform, digital asset trading, custody, and management platform, and so on. For example, the first network 801*a* can be a United States subnet for a provider institution, the second network 801*b* can be a Canadian subset for the provider institution, . . . , the second network 801*n* can be a European Union subset for the provider institution. A same user may hold an account at or has information stored in each network 801.

The network 801*a* includes a computing system 802*a*, model users 804*a*, and a blockchain registry 806*a*. The network 801*b* includes a computing system 802*b*, model users 804*a*, and a blockchain registry 806*a*. The network 801*n* includes a computing system 802*n*, model users 804*n*, and a blockchain registry 806*n*. The computing systems 802*a*, 802*b*, . . . , 802*n* can be collectively referred to as computing systems 802 and individually referred to as a computing system 802. The model users 804*a*, 804*b*, . . . , 804*n* can be collectively referred to as model users 804 for the networks 801 or model users 804 for a network 801. The computing systems 802*a*, 802*b*, . . . , 802*n* can be collectively referred to as computing systems 802 and individually referred to as a computing system 802. Examples of a model user 804 can include a member 604 or a model user 602.

Each network 801 is provided by a respective computing system 802, which can be one or more servers or platforms that is communicably coupled to the model users 804 to provide training (e.g., updating) of a ML model for the model users 804 in the network 801, in some arrangements. In some arrangements, the model users 804 can train (e.g., update) the ML model. The computing system 802 and the model users 804 can update the ML model based on a training dataset and a predetermined goal defined in a loss function or a gain function.

Each model user 804 within the network 801 is operated by a different user. A user can access the services and functions provided by the network 801 and the computing system 802 through operating a respective model user 804 within the network 801. Each user device can execute (e.g., via one or more processors and one or more memories) a client-side application that enables using and/or updating the version of the ML model. The computing system 802 can execute (e.g., via one or more processors and one or more memories) a server-side application that enable using and/or updating the version of the ML model. The original ML model to be updated or finetuned can be referred to as the base ML model.

In some examples, model users 804 and the computing systems 802 can be examples of the members 604, the model user 603, and the user devices 104, and the networks 801 can be examples of the networks 601 or 101. In other words, universal unique identifiers can be determined by a main network 620 for the entity (e.g., the model users 804 or the computing system 802) that trains or updates the versions of a ML model, for the version of the ML model, or for the tokens (e.g., the first tokens, the second tokens, or the third tokens) of the version of the ML model. The first tokens, the second tokens, and the third tokens for a version of an ML model may include a timestamp and can be digitally signed in the manner described herein.

Each network 801 includes a blockchain registry 806, which is a computing system (e.g., a server) that manages a distributed ledger database/blockchain 808 (e.g., one or more blockchains) for storing information. In some examples, the blockchain registry 806 for a given network is part of the computing system 802, such that the same hardware (e.g., processing circuits, network interface circuits, etc.) can be used to implement both the computing system 802 and the blockchain registry 806. In other examples, the blockchain registry 806 and the computing system 802 are implemented using separate hardware and are communicably coupled via a communication network, and the blockchain registry 806 and the computer system 802 are managed by separate entities. In some arrangements, the blockchain registry 806 is configured to store and manage versions of the ML model, the digital asset information (e.g., the first, second and third tokens) corresponding to versions of the ML model, the metadata (e.g., price, duration of use or license, limitations on license such as the total number for each of the first, second, or third token) of each version of the ML model, and so on the distributed ledger database/blockchain 808.

Given that the base ML model can be updated within a network 801 by different entities (e.g., the computing system 802 and the model users 804) and at different times, the distributed ledger database/blockchain 808 can track the different versions of the ML model within the network 801. For example, the distributed ledger database/blockchain 808 can store the information of the version of the ML model in various suitable manners.

At 812*a*, the computing system 802*a* provides (sends via a communication network) to the blockchain registry 806*a* information related to a version of the ML model trained by the computing system 802*a*. At 814*a*, each model user 804*a* provides (sends via a communication network) to the blockchain registry 806*a* information related to a version of the ML model trained by the model user 804*a*. At 812*b*, the computing system 802*b* provides (sends via a communication network) to the blockchain registry 806*b* information related to a version of the ML model trained by the computing system 802*b*. At 814*b*, each model user 804*b* provides (sends via a communication network) to the blockchain registry 806*b* information related to a version of the ML model trained by the model user 804*b*. At 812*n*, the computing system 802*n* provides (sends via a communication network) to the blockchain registry 806*n* information related to a version of the ML model trained by the computing system 802*n*. At 814*n*, each model user 804*n* provides (sends via a communication network) to the blockchain registry 806*n* information related to a version of the ML model trained by the model user 804*n*.

In some examples, at least one blockchain or blocks in a blockchain are dedicated specifically for storing a digital asset (e.g., a token such as an NFT) for a version of the ML model. Examples of the digital asset includes the first token, the second token, and the third token. The token (e.g., the first token) for a version of the ML model can include information such as an identifier (e.g., a universal unique identifier) of the base ML model, a version name, an identifier (e.g., a universal unique identifier) of an entity (e.g., the computing system 802 or a model user 804) that trained the version of the ML model, a link to the codes (e.g., weights, parameters, etc.) of the version of the ML model, a link to the training dataset used in training for this version of the ML model, a time when the version is created, a location where the version is created, and so on. In some examples, the content of such token is digitally signed by one or more of the entity (a network 801 or a model user 804) that trained the version of the ML model using a private key of that entity, a blockchain registry 606 that created the token using a private key of the blockchain registry 606, the blockchain registry 806 using a private key of the blockchain registry 806. In some examples, the token of the version of the ML model includes an identifier (e.g., a DID) of the version within the network 801.

In some examples, the main network 820 includes a universal resolver 120 for determining a universal unique identifier for a base ML model based on which different versions of the base ML model can be trained by the different model users 804 or the computing systems 802 in different networks 801. A computing device (such as the computing system 102) in each network 801 can assign a user identifier (e.g., a user DID) to the base ML model trained or updated by model users 804 or the computing system 802 within the network 801. A blockchain registry 806 in each network 801 (e.g., the network 101) can provide the provider institution identifier (e.g., provider DID) of the network 801 and the user identifier to the universal resolver 120 for determining the universal unique identifier of the user (e.g., the based ML model) in the manner described herein. For example, the universal resolver 120 can determine the universal unique identifier based at least in part on the provider institution identifiers and the user identifiers of the multiple networks 801.

In some examples, each type of the information of the version of the ML model can be individually tokenized (into multiple tokens in the manner described herein) and signed by the entity that trained the version of the ML model using a private key of the entity. Each token can be signed by the blockchain registry 806 (e.g., the blockchain registry 608) using a private key of the blockchain registry 806, for example, as described in FIG. 6.

Within a network 801, the computing system 802, the model users 804, and the blockchain registry 806 can communicate with each other over one or more communication networks. The blockchain registries 806 can communicate with the main network 820 over one or more communication networks such as those described herein.

The main network 820 can identify a champion ML model from the different versions of the ML model and distribute a digital asset (e.g., a token) corresponding to the champion ML model. The main network 820 includes at least one processing circuit (such as the processing circuit 122) to implement components and functions of the main network 820. For example, such processing circuit can be used to implemented one or more of the circuits 821, 824, and 828. The computing system 802, the model users 804, and the blockchain registries 806 each includes a processing circuit such as the processing circuit 122. The main network 820 further includes a network interface circuit such as the network interface circuit 128 configured for and structured to establish a connection and communicate with the networks 801 (e.g., the blockchain registries 806). The computing system 802, the model users 804, and the blockchain registries 806 each includes a network interface such as the processing circuit 128.

In some arrangements, the main network 820 can include a universal resolver 120 to determine a universal unique identifier for the ML model, based on the provider institution identifiers (e.g., DIDs) of the networks and the user identifiers (e.g., DIDs) of the different versions of the ML model, in the manner described.

At 830, the blockchain registry 806*a* provides (sends over a communication network) to the main network 820 (e.g., the model recording circuit 824) the token (e.g., the first token) of a first version of the ML model trained in the network 801*a* (e.g., by one or more of the model users 804*a* or the computing system 802*a*), at 832, the blockchain registry 806*b* provides (sends over a communication network) to the main network 820 (e.g., the model recording circuit 824) the token (e.g., the first token) of a second version of the ML model trained in the network 801*b* (e.g., by one or more of the model users 804*b* or the computing system 802*b*), . . . , and at 834, the blockchain registry 806*b* provides (sends over a communication network) to the main network 820 (e.g., the model recording circuit 824) the token (e.g., the first token) of a second version of the ML model trained in the network 801*n* (e.g., by one or more of the model users 804*n* or the computing system 802*n*). Other tokens such as the second tokens or the third tokens can be provided by the respective networks as described in FIGS. 6 and 7.

In some arrangements, in response to receiving a token from a blockchain registry 806 (e.g., at 830, 832, and 834), the main network 820 (e.g., the model recording circuit 824) verifies the signature of a blockchain registry 806 on the token using a public key of the blockchain registry 606. The private key used by the blockchain registry 806 to sign the content of the token and the public key of the blockchain registry 806 form a public-private key pair. In response to verifying the signatures on the token, the model recording circuit 824 provides the tokens to the blockchain registry 828, and the model approval circuit 821 selects or approves a champion or production model from the different versions of the ML model.

The model recording circuit 824 (e.g., at least one processing circuit) provides the tokens of the different versions of the same base ML model to the blockchain registry 828, which manages a distributed ledger database/blockchain 830 (e.g., one or more blockchains) for storing the tokens of the different versions of the ML model received from the networks 801. The distributed ledger database/blockchain 830 can store tokens of the different versions of the ML model in various suitable manners. In some examples, at least one blockchain or blocks in a blockchain are dedicated specifically for an ML model (e.g., a base ML model) and its different versions, as identified by the universal unique identifier of the base ML model. In such examples, each block is dedicated to storing at least one token (e.g., at least one mirror token or link to at least one token on the distributed ledger database(s)/blockchain(s) 608) each corresponding a version of the ML model. Each block in a dedicated blockchain or set of dedicated blocks for a given base ML model can store the universal unique identifier of the base ML model. As described with reference to FIG. 6, a universal unique identifier can be obtained by the main network 620 (e.g., the main network 840). Storing a token for a version of the ML model includes storing on a same block, a universal unique identifier of the token, the universal unique identifier of the base ML model, the mirror token or the link to the token on the distributed ledger database(s)/blockchain(s) 608). In some examples, a blockchain or a block of a blockchain can store the tokens of different versions of the ML model from different networks 801.

The model approval circuit 821 can select or approve a champion or production model from the different versions of the ML model. For example, a test dataset can be run by the model approval circuit 821 for each of the different versions of the ML model to determine a set of results, the version of the ML model with the best results (e.g., accuracy greater than a predetermined threshold or having the best accuracy as compared to the ground truth) is selected. The model approval circuit 821 can digitally sign the token of the champion or production model using a private key of the model approval circuit 821 or the main network 820.

At 840, the model approval circuit 821 provides an identifier or a link of the token of the champion or production model to each of the networks 801 (e.g., to each computing system 802 and model user 804) for use. A computing system 802 or model user 804 can verify the signature of the model approval circuit 821 or the main network 820 using a public key of the model approval circuit 821 or the main network 820. The public key of the model approval circuit 821 or the main network 820 and the private key of the public key of the model approval circuit 821 or the main network 820 form a public-private key pair. A computing system 802 or model user 804 can verify the signature of the entity that trained the version of the ML model selected as the champion or production model using a public key of that entity. The double verification process provides additional security and assurance that the selected champion or production model is safe and appropriate to use. The computing system 802 or model user 804 can train, update, or optimize this selected champion or production model using their respective datasets, in a next iteration of the method. The model approval circuit 821 can provide the selected champion or production model to a compliance circuit 823 for compliance review.

Figure 9:
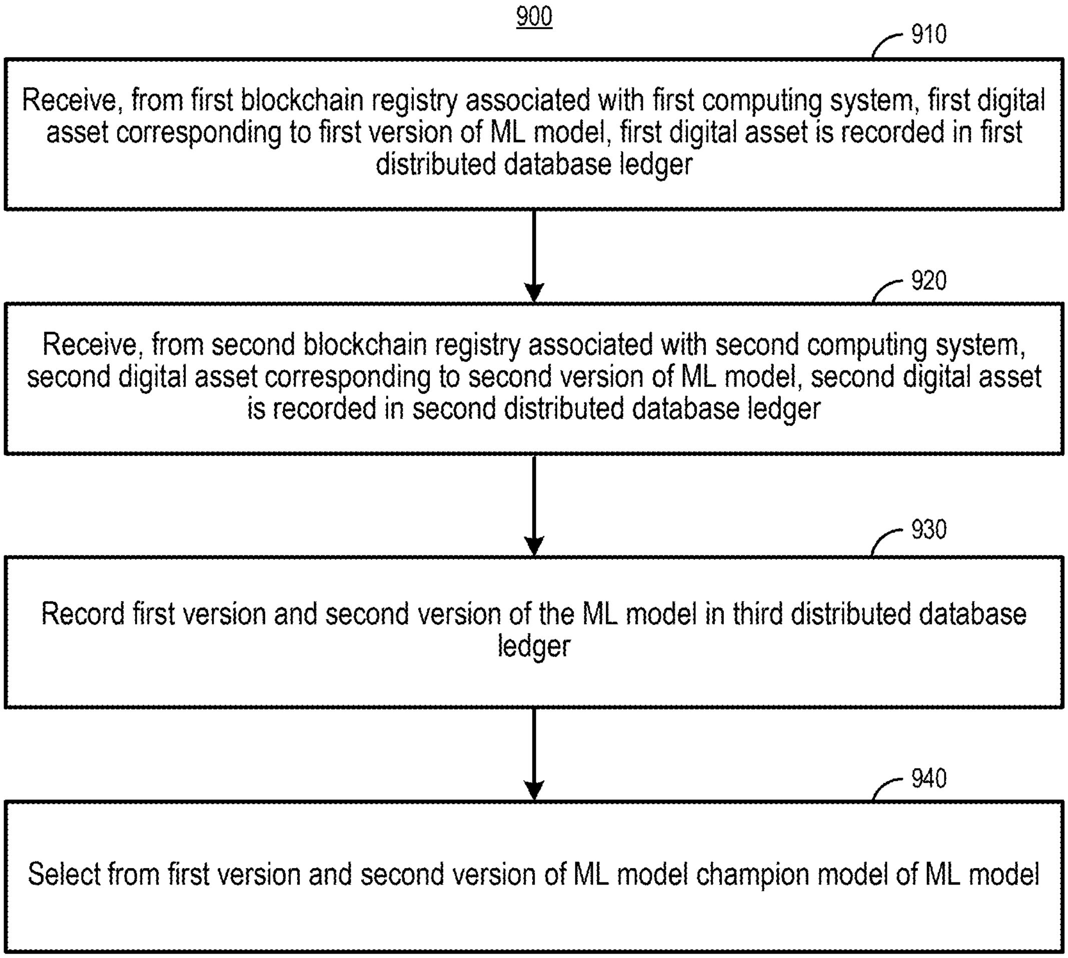
FIG. 9 is a flowchart diagram illustrating an example method for managing versions of ML models, according to various arrangements.

FIG. 9 is a flowchart diagram illustrating an example method 900 for managing versions of ML models, according to various arrangements. The method 900 can be performed in the system 800, for example, by the main network 820 (e.g., by one or more processors). The flow illustrated in FIG. 8 is an example implementation of the method 900.

At 910, the main network 820 receives, from a first blockchain registry (e.g., the blockchain registry 806*a*) associated with a first computing system (e.g., the computing system 802*a*), a first digital asset corresponding to a first version of an ML model. The first digital asset is recorded in a first distributed ledger database/blockchain (e.g., distributed ledger database/blockchain 808*a*).

At 920, the main network 820 receives, from a second blockchain registry (e.g., the blockchain registry 806*b*) associated with a second computing system (e.g., the computing system 802*b*), a second digital asset corresponding to a second version of the ML model. The second digital asset is recorded in a second distributed ledger database/blockchain (e.g., distributed ledger database/blockchain 808*b*).

In some examples, the first version of the ML model and the second version of the ML model are updated versions of a base ML model. The first digital asset includes a digital asset (e.g., a token) digitally signed by the first blockchain registry using a private key of the first blockchain registry. The second digital asset includes a digital asset (e.g., a token) digitally signed by the second blockchain registry using a private key of the second blockchain registry.

At 930, the main network 820 records the first version and the second version of the ML model in a third distributed ledger database/blockchain (e.g., distributed ledger database/blockchain 830). In some examples, a digital asset of the champion model is digitally signed by a third blockchain registry (e.g., the blockchain registry) using a private key of the third blockchain registry in response to selecting champion model.

At 940, the main network 820 selects from the first version and the second version of the ML model a champion model of the ML model. A model user 804 of the champion model verifies the champion model by verifying a first signature on the digital asset of the champion model using a public key of one of the blockchain registry that provided the digital asset of the champion model verifying a second signature on the digital asset of the champion model using a public key of the third blockchain registry.

In some examples, a digital asset of the champion model comprises one or more of an identifier of a base ML model, a version name of the version of the ML model, an identifier of an entity that trained the version of the ML model, a link to codes of the version of the ML model, a link to a training dataset used in training for the version of the ML model, a time when the version of the ML model is created, or a location where the version of the ML model is created. In some examples, the first digital asset is identified using a first DID. The second digital asset is identified using a second DID. The ML model is identified using a universal unique identifier generated based at least in part on the first DID and the second DID.

Some arrangements described herein relate to an all-in-one, end-to-end eVault (e.g., custodian) and digital assets marketplace. In some arrangements, an integrated platform is provided that receives a file (e.g., an electronic document, an eNote, a form file, and so on). The file can be any type of document such as a collateral file, a loan document, and so on. The platform can determined the validity of the information included in the file using at least one ML model. The platform can perform an Optical Character Recognition (OCR) program on the file prior to the validity check if needed. The platform can persist and encrypt the information. For example, the platform creates a pointer and boards the information on a blockchain as a digital asset (e.g., an NFT), assigns ownership and chain and control, update a registry. For compliance purposes (e.g., by investor of securities), the platform provides a service to an investor service is marketplace to trace assets and all processes flow automatically, e.g., with a single click.

Figure 10:
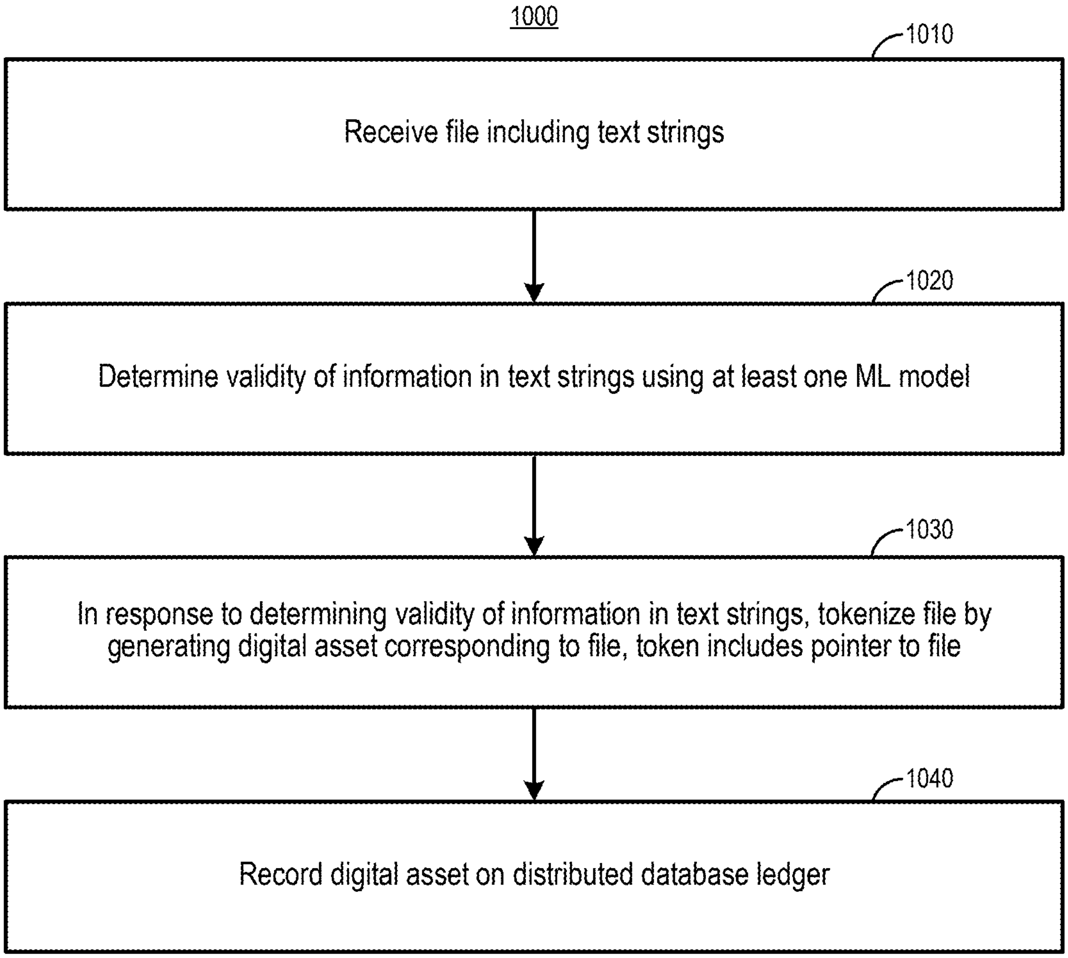
FIG. 10 is a flowchart diagram illustrating an example method for providing a custody of digital assets, according to various arrangements.

FIG. 10 is a flowchart diagram illustrating an example method 1000 for providing a custody of digital assets, according to various arrangements. The method 1000 can be performed using at least the system 800. At 1010, a file including text strings is received by a model user 804 or a computing system 802 of a given network 801 from a third-party device, such as an external database or a customer device. In some examples, the file can be received by the computing system 802 from the model user 804. In response to receiving the file, the model user 804 or a computing system 802 can store the file on a database or a memory of the model user 804 or a computing system 802, accessible via a link. At 1020, a validity of information in the text strings is determined by the computing system 802 or the model user 804 using at least one ML model. Each of the at least one ML model can include a version of the ML model described herein or a selected champion model or production model. The computing system 802 or the model user 804 can run any suitable version of a ML model, such as a Large Language Model (LLM) trained by the computing systems 802 and/or the model users 804 across the different networks 801 to detect fields (e.g., via syntax of the strings or via bounding boxes corresponding to the fields) and check the file for missing fields in forms.

At 1030, in response to determining the validity of the information in the text strings, the file is tokenized by generating a digital asset corresponding to the file, the token includes a pointer (e.g., a link) to the file. For example, the blockchain registry 806 of the network 801 can provide the point to the file to the blockchain registry 806 of the network 801, which tokenizes the file by determining a token for the file that includes the pointer to the file. At 1040, the digital asset is recorded by the blockchain registry 806 on a distributed ledger database/blockchain 808 in the network 801. In some examples, the file can be used as training dataset to train the version of ML model in the manner described. In this case, the token for the file is a third token as described herein. In some examples, the file can be used to verify or validate the different versions of the ML models to select the champion or production model.

In some arrangements, the file includes at least one of an electronic document or eNote. In some arrangements, the digital asset is signed using a private key of a blockchain registry of the distributed ledger database/blockchain, wherein the digital asset can be verified using a public key of the blockchain registry. In some arrangements, the at least one processor is further configured to perform OCR of the file to extract the text strings.

In some arrangements, the method further includes receiving, from a first blockchain registry associated with a first computing system, a first provider institution identifier of a first provider institution and a first user identifier of the file. The first provider institution identifier and the first user identifier are recorded in a first distributed ledger database/blockchain. In some arrangements, the method further includes receiving, from a second blockchain registry associated with a second computing system, a second provider institution identifier of a second provider institution and a second user identifier of the file, the second provider institution identifier and the second user identifier are recorded in a second distributed ledger database/blockchain. In some arrangements, the method further includes determining a universal unique identifier for the file based at least in part on the first provider institution identifier, the first user identifier, the second provider institution identifier, and the second user identifier.

In some arrangements, determining universal unique identifier for the file includes concatenating the first provider institution identifier, the first user identifier, the second provider institution identifier, and the second user identifier. In some arrangements, determining the universal unique identifier for the user comprises running the first provider institution identifier, the first user identifier, the second provider institution identifier, and the second user identifier in at least one mathematical function.

While this specification contains many specific implementation details and/or arrangement details, these should not be construed as limitations on the scope of any disclosure or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some arrangements, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively, or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some arrangements, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the arrangements might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), math-based currencies (often referred to as cryptocurrencies), and central bank digital currency (often referred to as CBDC). Examples of math-based currencies include Bitcoin, Ethereum, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

What is claimed is:

1. A system, comprising:

a computing system comprising at least one processor and at least one memory coupled to the at least one processor, wherein the at least one processor is configured to:

receive a file comprising text strings;

determine a validity of information in the text strings using at least one Machine Learning (ML) model;

in response to determining the validity of the information in the text strings, tokenize the file by generating a digital asset corresponding to the file, the token includes a pointer to the file; and record the digital asset on a distributed ledger database/blockchain;

wherein the digital asset is signed using a private key of a blockchain registry of the distributed ledger database/blockchain, and wherein the digital asset can be verified using a public key of the blockchain registry.

2. The system of claim 1, wherein the file comprises at least one of an electronic document or eNote.

3. The system of claim 1, wherein the at least one processor is further configured to perform Optical Character Recognition (OCR) of the file to extract the text strings.

4. The system of claim 1, wherein the at least one processor is configured to:

receive, from a first blockchain registry associated with a first computing system, a first provider institution identifier of a first provider institution and a first user identifier of the file, wherein the first provider institution identifier and the first user identifier are recorded in a first distributed ledger database/blockchain;

receive, from a second blockchain registry associated with a second computing system, a second provider institution identifier of a second provider institution and a second user identifier of the file, wherein the second provider institution identifier and the second user identifier are recorded in a second distributed ledger database/blockchain;

determine a universal unique identifier for the file based at least in part on the first provider institution identifier, the first user identifier, the second provider institution identifier, and the second user identifier.

5. The system of claim 4, wherein universal unique identifier for the file comprises concatenating the first provider institution identifier, the first user identifier, the second provider institution identifier, and the second user identifier.

6. The system of claim 4, wherein determining the universal unique identifier for the user comprises running the first provider institution identifier, the first user identifier, the second provider institution identifier, and the second user identifier in at least one mathematical function.

7. A method, comprising:

receiving a file comprising text strings;

determining a validity of information in the text strings using at least one Machine Learning (ML) model;

in response to determining the validity of the information in the text strings, tokenizing the file by generating a digital asset corresponding to the file, the token includes a pointer to the file; and recording the digital asset on a distributed ledger database/blockchain;

wherein the digital asset is signed using a private key of a blockchain registry of the distributed ledger database/blockchain, and wherein the digital asset can be verified using a public key of the blockchain registry.

8. The method of claim 7, wherein the file comprises at least one of an electronic document or eNote.

9. The method of claim 7, wherein the at least one processor is further configured to perform Optical Character Recognition (OCR) of the file to extract the text strings.

10. The method of claim 7, further comprising:
- receiving, from a first blockchain registry associated with a first computing system, a first provider institution identifier of a first provider institution and a first user identifier of the file, wherein the first provider institution identifier and the first user identifier are recorded in a first distributed ledger database/blockchain;
- receiving, from a second blockchain registry associated with a second computing system, a second provider institution identifier of a second provider institution and a second user identifier of the file, wherein the second provider institution identifier and the second user identifier are recorded in a second distributed ledger database/blockchain;
- determining a universal unique identifier for the file based at least in part on the first provider institution identifier, the first user identifier, the second provider institution identifier, and the second user identifier.

11. The system of claim 10, wherein universal unique identifier for the file comprises concatenating the first provider institution identifier, the first user identifier, the second provider institution identifier, and the second user identifier.

12. The system of claim 10, wherein determining the universal unique identifier for the user comprises running the first provider institution identifier, the first user identifier, the second provider institution identifier, and the second user identifier in at least one mathematical function.

13. At least one non-transitory processor-readable medium comprising processor-readable instructions such that, when executed by at least one processor, causes the at least one processor to:
- receive a file comprising text strings;
- determine a validity of information in the text strings using at least one Machine Learning (ML) model;
- in response to determining the validity of the information in the text strings, tokenize the file by generating a digital asset corresponding to the file, the token includes a pointer to the file; and
- record the digital asset on a distributed ledger database/blockchain;
- wherein the digital asset is signed using a private key of a blockchain registry of the distributed ledger database/blockchain, and wherein the digital asset can be verified using a public key of the blockchain registry.

14. The non-transitory processor-readable medium of claim 13, wherein the file comprises at least one of an electronic document or eNote.

15. The non-transitory processor-readable medium of claim 13, wherein the at least one processor is further configured to perform Optical Character Recognition (OCR) of the file to extract the text strings.

16. The non-transitory processor-readable medium of claim 13, wherein the at least one processor is caused to:
- receive, from a first blockchain registry associated with a first computing system, a first provider institution identifier of a first provider institution and a first user identifier of the file, wherein the first provider institution identifier and the first user identifier are recorded in a first distributed ledger database/blockchain;
- receive, from a second blockchain registry associated with a second computing system, a second provider institution identifier of a second provider institution and a second user identifier of the file, wherein the second provider institution identifier and the second user identifier are recorded in a second distributed ledger database/blockchain;
- determine a universal unique identifier for the file based at least in part on the first provider institution identifier, the first user identifier, the second provider institution identifier, and the second user identifier.

17. The non-transitory processor-readable medium of claim 16, wherein:
- the universal unique identifier for the file comprises concatenating the first provider institution identifier, the first user identifier, the second provider institution identifier, and the second user identifier; and
- determining the universal unique identifier for the user comprises running the first provider institution identifier, the first user identifier, the second provider institution identifier, and the second user identifier in at least one mathematical function.

18. A system, comprising:
- a computing system comprising at least one processor and at least one memory coupled to the at least one processor, wherein the at least one processor is configured to:
- receive a file comprising text strings;
- determine a validity of information in the text strings using at least one Machine Learning (ML) model;
- in response to determining the validity of the information in the text strings, tokenize the file by generating a digital asset corresponding to the file, the token includes a pointer to the file;
- record the digital asset on a distributed ledger database/blockchain;
- receive, from a first blockchain registry associated with a first computing system, a first provider institution identifier of a first provider institution and a first user identifier of the file, wherein the first provider institution identifier and the first user identifier are recorded in a first distributed ledger database/blockchain;
- receive, from a second blockchain registry associated with a second computing system, a second provider institution identifier of a second provider institution and a second user identifier of the file, wherein the second provider institution identifier and the second user identifier are recorded in a second distributed ledger database/blockchain; and
- determine a universal unique identifier for the file based at least in part on the first provider institution identifier, the first user identifier, the second provider institution identifier, and the second user identifier.

19. A method, comprising:
- receiving a file comprising text strings;
- determining a validity of information in the text strings using at least one Machine Learning (NIL) model;
- in response to determining the validity of the information in the text strings, tokenizing the file by generating a digital asset corresponding to the file, the token includes a pointer to the file;
- recording the digital asset on a distributed ledger database/blockchain;
- receiving, from a first blockchain registry associated with a first computing system, a first provider institution identifier of a first provider institution and a first user identifier of the file, wherein the first provider institution identifier and the first user identifier are recorded in a first distributed ledger database/blockchain;

receiving, from a second blockchain registry associated with a second computing system, a second provider institution identifier of a second provider institution and a second user identifier of the file, wherein the second provider institution identifier and the second user identifier are recorded in a second distributed ledger database/blockchain; and determining a universal unique identifier for the file based at least in part on the first provider institution identifier, the first user identifier, the second provider institution identifier, and the second user identifier.

20. At least one non-transitory processor-readable medium comprising processor-readable instructions such that, when executed by at least one processor, causes the at least one processor to:

receive a file comprising text strings;

determine a validity of information in the text strings using at least one Machine Learning (ML) model;

in response to determining the validity of the information in the text strings, tokenize the file by generating a digital asset corresponding to the file, the token includes a pointer to the file;

record the digital asset on a distributed ledger database/blockchain;

receive, from a first blockchain registry associated with a first computing system, a first provider institution identifier of a first provider institution and a first user identifier of the file, wherein the first provider institution identifier and the first user identifier are recorded in a first distributed ledger database/blockchain;

receive, from a second blockchain registry associated with a second computing system, a second provider institution identifier of a second provider institution and a second user identifier of the file, wherein the second provider institution identifier and the second user identifier are recorded in a second distributed ledger database/blockchain; and determine a universal unique identifier for the file based at least in part on the first provider institution identifier, the first user identifier, the second provider institution identifier, and the second user identifier.

* * * * *